US007911412B2

(12) United States Patent
Benner, Jr. et al.

(10) Patent No.: US 7,911,412 B2
(45) Date of Patent: Mar. 22, 2011

(54) AUDIENCE SCANNING LIGHT PROJECTOR AND ASSOCIATED METHODS

(76) Inventors: William R. Benner, Jr., Longwood, FL (US); Valeriy Furmanov, Kharkov (UA); Alexey Sinitsyn, Kharkov (UA)

( * ) Notice: Subject to any disclaimer, the term of this patent is extended or adjusted under 35 U.S.C. 154(b) by 999 days.

(21) Appl. No.: 11/072,714

(22) Filed: Mar. 4, 2005

(65) Prior Publication Data

US 2008/0106654 A1    May 8, 2008

Related U.S. Application Data

(60) Provisional application No. 60/625,394, filed on Nov. 5, 2004, provisional application No. 60/645,543, filed on Jan. 19, 2005, provisional application No. 60/650,283, filed on Feb. 4, 2005.

(51) Int. Cl.
*G09G 3/20* (2006.01)
(52) U.S. Cl. ............................ 345/55; 353/28; 372/38.09
(58) Field of Classification Search .................. 348/745; 372/38.09; 353/122; 345/55
See application file for complete search history.

(56) References Cited

U.S. PATENT DOCUMENTS

| 4,006,970 | A | | 2/1977 | Slater et al. |
| 5,067,653 | A | * | 11/1991 | Araki et al. ...................... 239/18 |
| 5,130,838 | A | | 7/1992 | Tanaka et al. |
| 5,546,139 | A | | 8/1996 | Bacs, Jr. et al. |
| 6,256,121 | B1 | * | 7/2001 | Lizotte et al. .................... 359/15 |
| 6,333,826 | B1 | * | 12/2001 | Charles .......................... 359/725 |
| 6,580,560 | B1 | | 6/2003 | Benner, Jr. |
| 6,867,753 | B2 | | 3/2005 | Chinthammit et al. |
| 6,919,892 | B1 | | 7/2005 | Cheiky et al. |
| 7,190,329 | B2 | | 3/2007 | Lewis et al. |
| 7,301,558 | B2 | | 11/2007 | Gluck |
| 2005/0035943 | A1 | * | 2/2005 | Kojima .......................... 345/156 |
| 2005/0117132 | A1 | * | 6/2005 | Agostinelli .................... 353/122 |
| 2006/0139319 | A1 | | 6/2006 | Kariathungal et al. |
| 2007/0279494 | A1 | | 12/2007 | Aman et al. |

OTHER PUBLICATIONS

Benner, William, Jr. New Tools for Eye-Safe Measurements, The Laserist, Spring 1997, p. 11 & 14, vol. 8 No. 2, U.S.
Benner, William, Jr. Tools to Keep Audience Scanning Safe, The Laserist, Summer 1997, pp. 11-13, vol. 8 No. 3, U.S.
Benner, William, Jr. Evaluating Audience Scanning Effects, The Laserist, Fall 1997, vol. 8 No. 4, U.S.
Benner, William, Jr. Laserists Tackle Scanning Safety Issue, The Laserist, Winter 1998, vol. 9 No. 4, U.S.
Benner, William, Jr. Making Shows Safe and Enjoyable, Internet article published on www.ilda.wa.org, 1997, U.S.

* cited by examiner

*Primary Examiner* — Amr Awad
*Assistant Examiner* — Yong Sim
(74) *Attorney, Agent, or Firm* — Allen, Dyer, Doppelt, Milbrath & Gilchrist, P.A.

(57) ABSTRACT

A scanning laser system has a scan position controller to control an X-Y beam translator and a beam power controller to control a light source. A processor has accessible a table having a matrix of elements representing regions having spatial coordinates in at least two dimensions. A plurality of regions is required to define a space approximately sized as a human head. Each element contains a beam power variable indicative of radiation exposure at a corresponding region. Software resident in the processor has code for receiving a value of beam power incident on each region being scanned, for incrementing a stored beam power variable for each region if the beam power value is above a predetermined threshold, and for outputting to at least one of the scan position and the beam power controller a signal indicative of each region at which the beam power variable is above a predetermined value.

30 Claims, 17 Drawing Sheets

AUDIENCE SCANNING LIGHT PROJECTOR AND ASSOCIATED METHODS

RELATED APPLICATION

This application claims priority from co-pending provisional application Ser. No. 60/625,394, filed on Nov. 5, 2004, and Ser. No. 60/645,543, which was filed on Jan. 19, 2005, and Ser. No. 60/650,283, filed on Feb. 4, 2005, all of which are incorporated herein by reference in their entirety.

FIELD OF THE INVENTION

The present invention relates to the field of laser projectors and, more particularly, to a laser projector for projecting patterns and arrays of beams directly into an audience for entertainment display purposes

BACKGROUND OF THE INVENTION

Projectors for laser display can generally be categorized into one of three groups: graphics projectors, beam projectors, and audience scanning projectors.

Graphics projectors are those which project logos, text and other figures onto some projection surface such as a screen. To create images, these projectors employ an X-Y scanning system, usually including two small mirrors mounted on galvanometer scanners. It is well known in the art that galvanometer scanners allow for omnidirectional scanning and are not restricted to tracing out successive rows or columns, as are raster scanners. One mirror scans the beam in one linear direction (for example, horizontally) onto the second mirror, which scans the beam in the perpendicular direction (for example, vertically). The combined X-Y motion is normally used to draw outline-type vector images, using a point-by-point "connect the dots" method, according to software commands effected by a programmable controller operably connected with the laser projector. The audience views these figures on the screen in the same way that an audience would view a movie being projected onto a screen.

A beam projector produces beams of light that are projected into mid-air. The beams are viewable in mid-air by virtue of fog, dust and moisture that either exists in the air or which is created by the performer or venue. The beams are often animated to produce a dynamic effect. The beams can be moved and animated in a number of ways. For purposes of this invention, an X-Y scanning system is also used. The scanning system may be identical to that of graphics projectors (the projector is merely aimed into the air instead of at a screen), or the scanning system may scan more slowly than that of graphics projectors (since complex images may not be required). Use of an X-Y scanning system allows flexibility to create both simple placement of the beam to hit target mirrors or objects and also to allow more complex patterns such as circles and shapes to be projected.

With both graphics and beam projectors, the generated light, typically a laser beam, never comes in contact with the audience. The light merely travels from the projector to its destination surface, or along an uninterrupted path in mid air.

Audience scanning projectors typically combine features of both graphics and beam projectors. Audience scanning projectors use X-Y scanners to project geometric figures, patterns and arrays of light beams directly into a viewing audience. As with beam projectors, when the laser is projected toward an audience, its beam also illuminates any fog, dust, and moisture in the air. The beams create dancing sculptures that are very pleasing to audience members and the beam comes in direct contact with the audience. The effect generated creates the illusion of being surrounded by a tunnel of light and by other geometric shapes that are formed by the light. One viewer has compared it to being inside a fireworks display, or at the bottom of a swimming pool filled with light. A typical audience scanning projector, as known in the art, is shown in FIG. 4. It should be noted that while audience scanning projectors are common in many foreign countries, in the U.S. safety considerations and legal liability have made it difficult to gain approval from regulatory agencies and from customers for scanning an audience.

In the case of each of the three projector types described above, the X-Y signals and beam power level signals are generated by a programmable controller which generally comprises a personal computer having suitable interface hardware, and running software for generating the images, patterns and shapes. The hardware generally includes an interface circuit board that connects to the computer. This interface circuit board includes digital-to-analog converters and voltage amplifiers, so that signals can be produced which correspond to X-Y beam positions, and to beam power levels. The X-Y beam positions and beam power levels produced by the interface hardware are sometimes referred to as "command signals," since these signals represent the software's intention for the projector to follow. The software program generates the X-Y beam positions and beam power level "command signals" and periodically transfers these as digital data to the digital-to-analog converters in the interface circuit board. Those skilled in the art will know that any suitable interface hardware and software may be used to control any of the three projector types mentioned above. However, in the present invention preferred hardware and software systems include the QuadMod™ series of hardware boards and Lasershow Designer™ series of laser software, both from Pangolin Laser Systems, Orlando, Fla.

When projecting a laser beam toward a viewer, eye safety is a major concern. If an intense laser beam were to stop scanning and stopped directly on the pupil of a viewer's eye, retinal damage can occur if the beam has sufficiently high power and a sufficiently long dwell time. Likewise, even if the beam is not stopped but is scanned across the pupil of an eye, it can still cause retinal damage if the beam power is high enough, or if the beam is scanning slowly enough.

In audience scanning projectors in the current state of the art, the X and Y beam position signals generated by the X-Y scanners are mathematically differentiated to produce an output equivalent to X and Y beam velocity. The X and Y beam velocities are added together to produce the total beam velocity. This total beam velocity is monitored (compared to some pre-set minimum allowable velocity) to make sure that the beam velocity is sufficiently high. If the beam were to stop (producing zero velocity) or the velocity were to otherwise drop below some preset threshold, this would be considered a "scanning failure". Under a scanning failure condition, the beam may be completely turned off by the light beam modulator or by a shutter. This type of system is called a "scan-fail monitor". Note that a scan-fail monitor is most often implemented in the form of analog signal conditioning components, but may also be implemented with computer hardware and software. A typical scan-fail monitor as know in the art is shown in FIG. 5.

While scan-fail monitors provide some level of protection for the audience, there are a number of problems that still remain. First, a scan-fail monitor does not provide automatic power level control in different regions of the scan field. For example, scan-fail monitors are not capable of allowing a higher power level over the audience's heads or below their eyes. Second, scan-fail monitors can be easily "fooled" into believing that there is a safe condition when there is not, because they only monitor the rate of change of position and do not track the actual position of the beam. For example, if the beam alternates between two fixed locations, thereby concentrating 50% of the beam power in each position, the scan-fail monitor may allow this condition since the beam is technically scanning. However, in many instances, a 50% concentration of beam power could be hazardous. Therefore, improvements are still required over the use of a scan-fail monitor alone.

The actual process of evaluating the show material being projected into an audience is an extremely time consuming task which is prone to error. The current state of the art requires a beam power meter capable of measuring irradiance (beam power per unit area), a fast silicon photodiode, an oscilloscope, a scientific calculator, and sufficient skill to use these instruments. The beam power meter must be used to measure the "static beam irradiance at the closest point of audience access". The fast silicon photodiode and oscilloscope are used together to measure the pulse characteristics of the scanning light beam. Finally, the scientific calculator is used to perform calculations using the irradiance and pulse characteristics to evaluate whether the effect is safe or not.

While performing an evaluation of the show, each effect must be evaluated for three separate criteria, often termed maximum permissible exposure (MPE) levels, as described in well established safety standards including the IEC 60825-1 and the ANSI Z136.1. The three criteria are the single pulse MPE, multiple pulse MPE, and average power MPE. The scanning effect must not exceed any of these three MPE levels in order to be considered safe.

The terms "single pulse" and "multiple pulse" refer to a phenomenon that the human eye perceives due to the scanning action. When a laser beam scans across the pupil of the viewer's eye, it is said to deliver a pulse of laser light to the viewer's eye. This is because as the beam scans past the viewer's eye, it will only enter the eye for a brief time, depending on the beam diameter and the scan rate. This perceived pulse of light created by the scanned beam is similar to a pulse that is created by a beam which is not scanning, but is turned on for only a brief instant. The amount of time that the beam is on within the viewer's pupil is called the pulse width. For audience scanning shows, this pulse-width is typically between about 20 to 500 microseconds.

When an audience scanning effect is being projected, such as a tunnel or sheet scan, this is done by repeatedly scanning the tunnel or sheet to make it appear solid. As the beam crosses the viewer's eye, it will generate a pulse of light entering the eye. Since the X-Y scanners will trace this effect many times to make it appear to be solid, the viewer's eye may receive multiple pulses of light if the effect and viewer are stationary. The reason why pulses and multiple pulses are important, is that safety standards prescribe a maximum amount of light, that is, a maximum permissible exposure (MPE) that the viewer can be receive for a single pulse, and for multiple pulses.

During the show evaluation process mentioned above, the show must essentially be in a "paused" state while measurements can be taken, and these measurements typically require several minutes per effect. This means that if a show has hundreds of different effects, a considerable amount of time must be spent evaluating the show material. Moreover, if an effect does exceed any of the MPE levels mentioned above, the effect must be "re-programmed" so that a safe show can be produced.

There are several pieces of software on the market to aid in the task of safety evaluation and calculation of MPE levels. While the use of software in the current state of the art can remove some of the tedium and possible human error when performing many calculations, there is currently no software that can run in real time to evaluate scanning beams on the fly, and automatically reduce power levels when needed. In addition, all software programs in the current state of the art require that the user know many projection parameters which may not be readily known or easily determined, such as scan angle, actual beam diameter at the laser projector, and actual beam divergence that exists as a function of the laser and of projection system components.

The current invention completely eliminates the need for manual and tedious evaluation of the scanned laser output. It does this by using a computer algorithm that monitors beam position and beam power, and by generating a correction signal and applying this correction signal to reduce the beam power, if a reduction is needed. The present invention makes use of a memory structure so that a minimum of computational power is required to perform these tasks. This allows the system to process the data, generate the correction signal, and reduce the power in real time, while the software is running on currently available personal computers. This invention also generates a visual display which can be used to monitor the hazard potential of the scanning beams, thus providing information to the user. The information garnered by an operator observing the visual display may be used to change the show so as to reduce or eliminate any original hazard potential, or to create an artistically improved show. This invention may be integrated with the same computer that generates the "command signals."

SUMMARY OF THE INVENTION

With the foregoing in mind, the present invention advantageously provides an Intelligent beam power attenuation system which monitors the instantaneous position and instantaneous beam power of a scanning light beam, generates a correction signal, applies this correction signal when needed, and controls the output beam power based on the maximum power allowed at that instantaneous position. This "maximum power allowed" (MPA) may take into account all three MPE levels described above.

The present invention additionally provides an intelligent beam power monitoring system which can be used to visually illustrate the accumulated beam power and thus, shows the potential eye hazards that exist in different regions of the scan field. This display may be effected as an integral part of the intelligent beam power attenuation process, or as a separate and/or optional process.

BRIEF DESCRIPTION OF THE DRAWINGS

Some of the features, advantages, and benefits of the present invention having been stated, others will become apparent as the description proceeds when taken in conjunction with the accompanying drawings, presented for solely for exemplary purposes and not with intent to limit the invention thereto, and in which.

DETAILED DESCRIPTION OF THE PREFERRED EMBODIMENT

The present invention will now be described more fully hereinafter with reference to the accompanying drawings, in which preferred embodiments of the invention are shown. Unless otherwise defined, all technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. Any publications, patent applications, patents, or other references mentioned herein are incorporated by reference in their entirety. In case of conflict, the present specification, including any definitions, will control. In addition, the materials, methods and examples given are illustrative in nature only and not intended to be limiting. Accordingly, this invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Other features and advantages of the invention will be apparent from the following detailed description, and from the claims.

In the present invention, the term "light beam modulator" is used to describe a device which may be separate from the laser itself and which can control the power of the laser, for example, an acousto-optic modulator. The term may also be used to describe one or more laser power supplies if direct laser modulation is used.

The invention, in an apparatus for projecting a high intensity light beam such as a laser beam, provides the ability of monitoring the beam position as well as the beam power of the light beam. Monitoring may be accomplished by directly measuring the beam position and beam power, or indirectly by predicting the probable beam position and beam power using a version of the command signals that will be sent to X-Y scanners and light beam modulators. The "direct measurement" and "indirect prediction" methods are discussed in the next few paragraphs.

Direct Measurement of Beam Position and Power

Figure 3A:
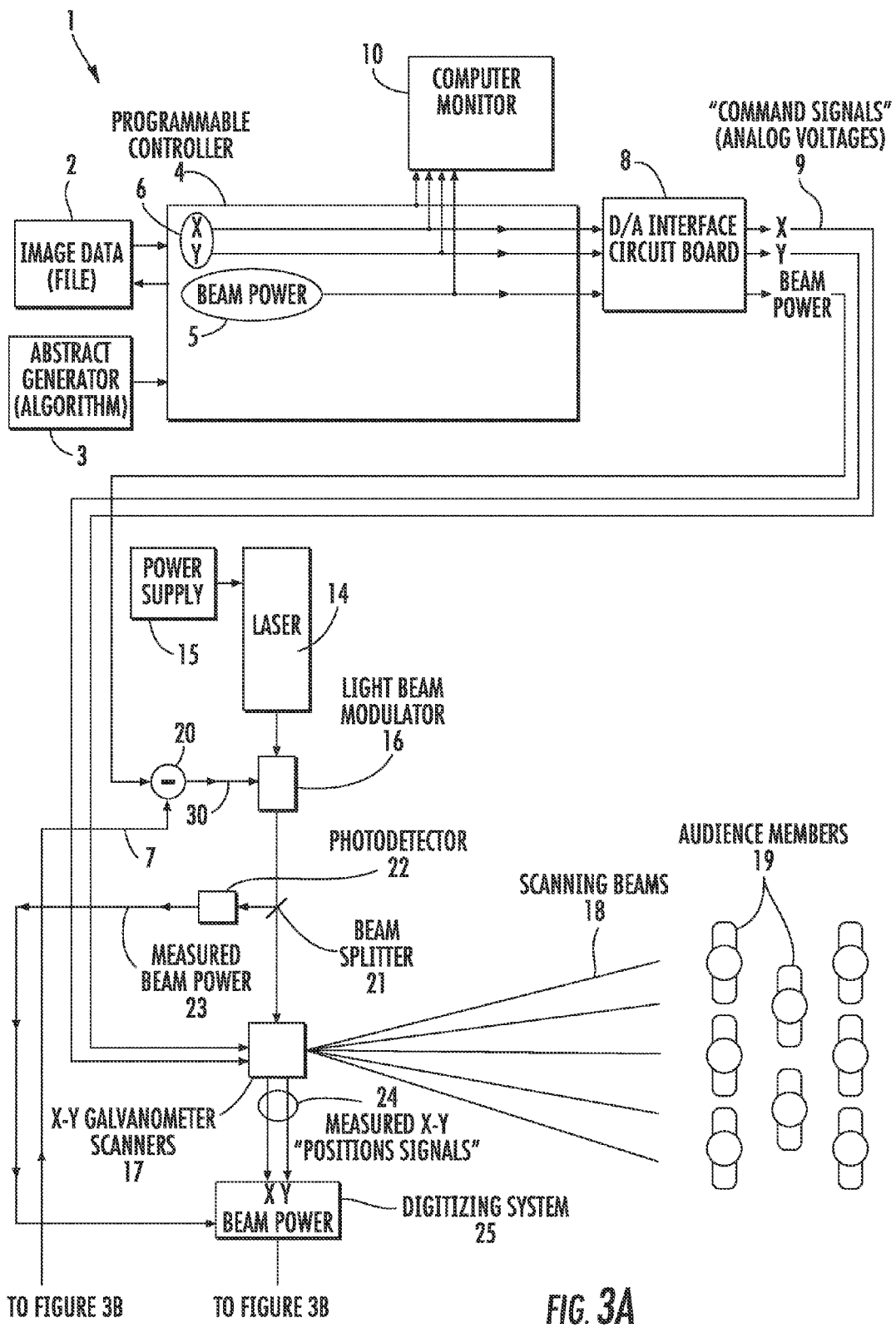
FIG. 3 depicts yet another embodiment of the present invention.
Figure 3B:
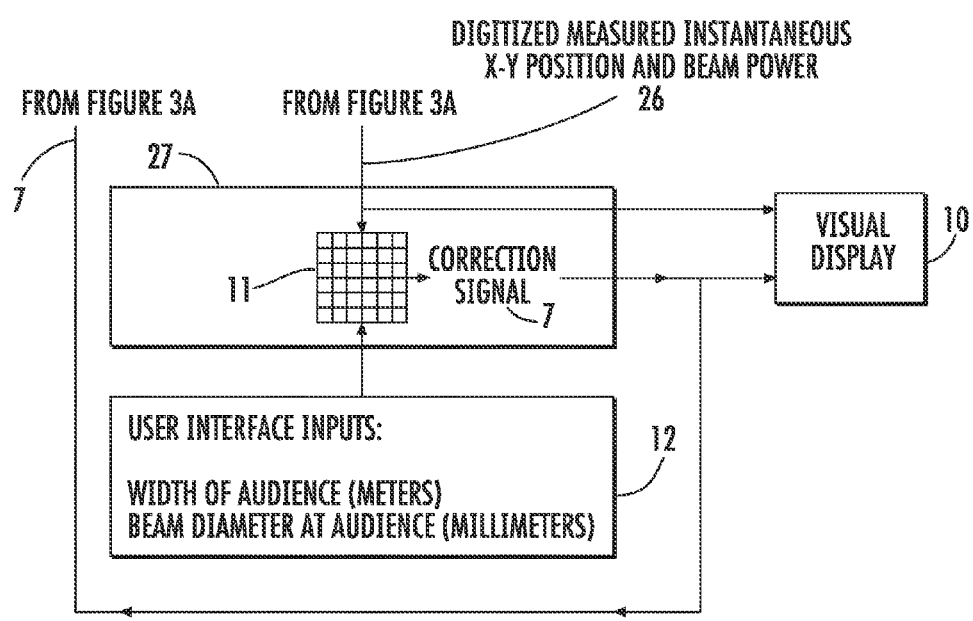
Figure 4:
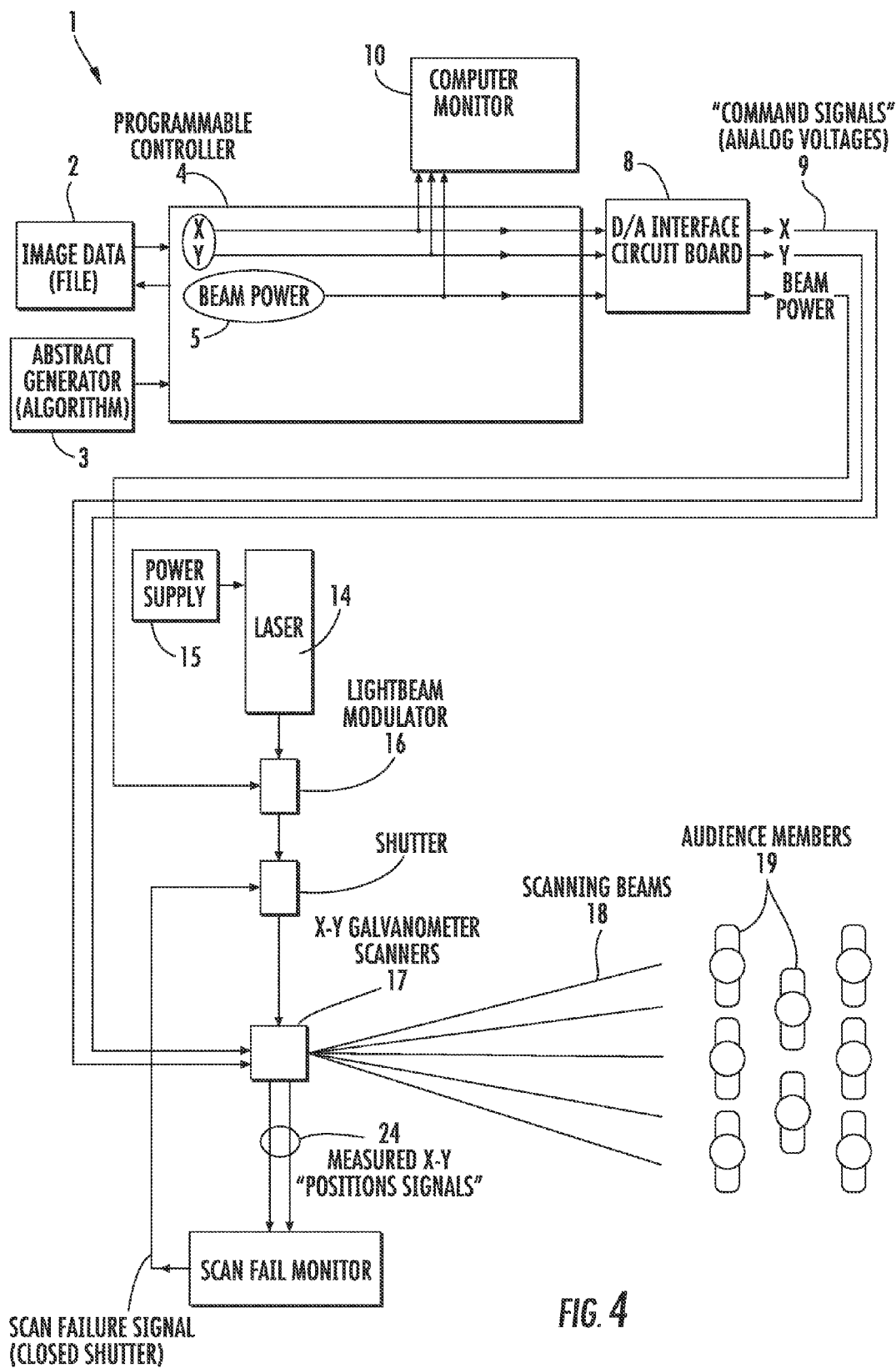
FIG. 4 shows a prior art audience scanning projector employing a scan-fail monitor.
Figure 5:
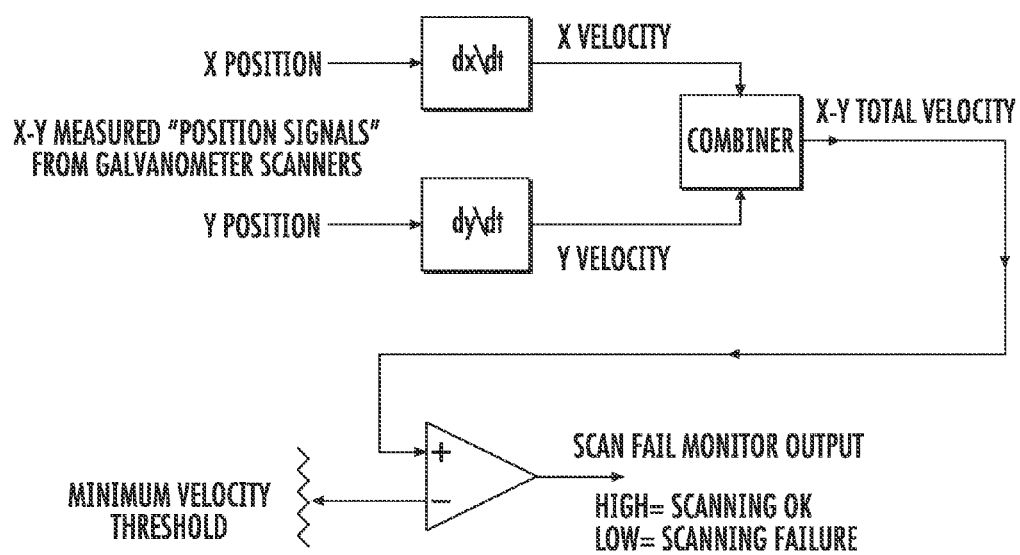
FIG. 5 illustrates a typical scan-fail monitor that exists in the current state of the art.
Figure 6:
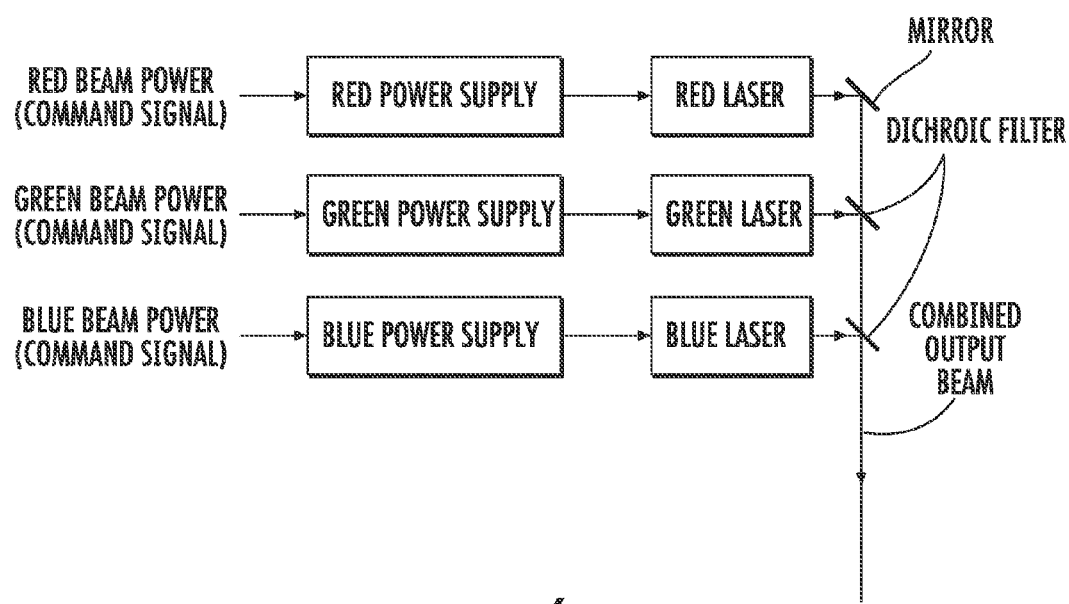
FIG. 6 shows how three separate lasers can be combined into a single beam for use in the present invention.
Figure 7:
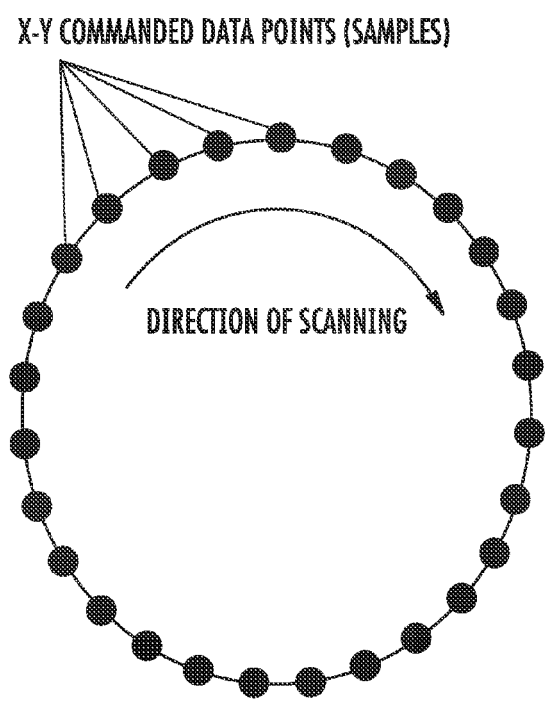
FIG. 7 shows the X-Y data points commanded by the programmable controller "command signals" and the circular shape that results by using a connect-the-dots drawing method.
Figure 8:
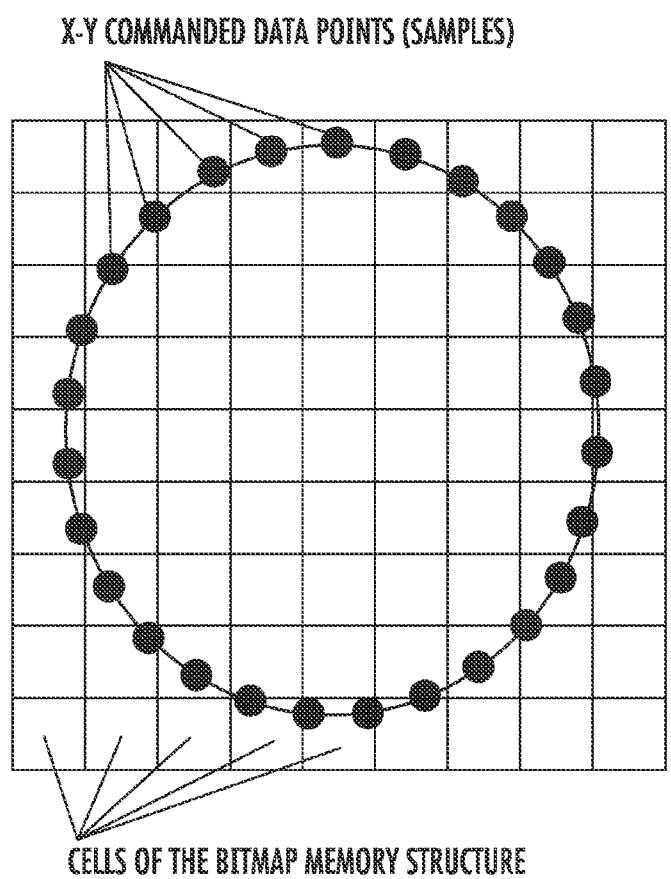
FIG. 8 shows a bitmap memory structure used by one possible embodiment of this invention, and how the position of the X-Y data points correspond to bitmap locations.
Figure 9:
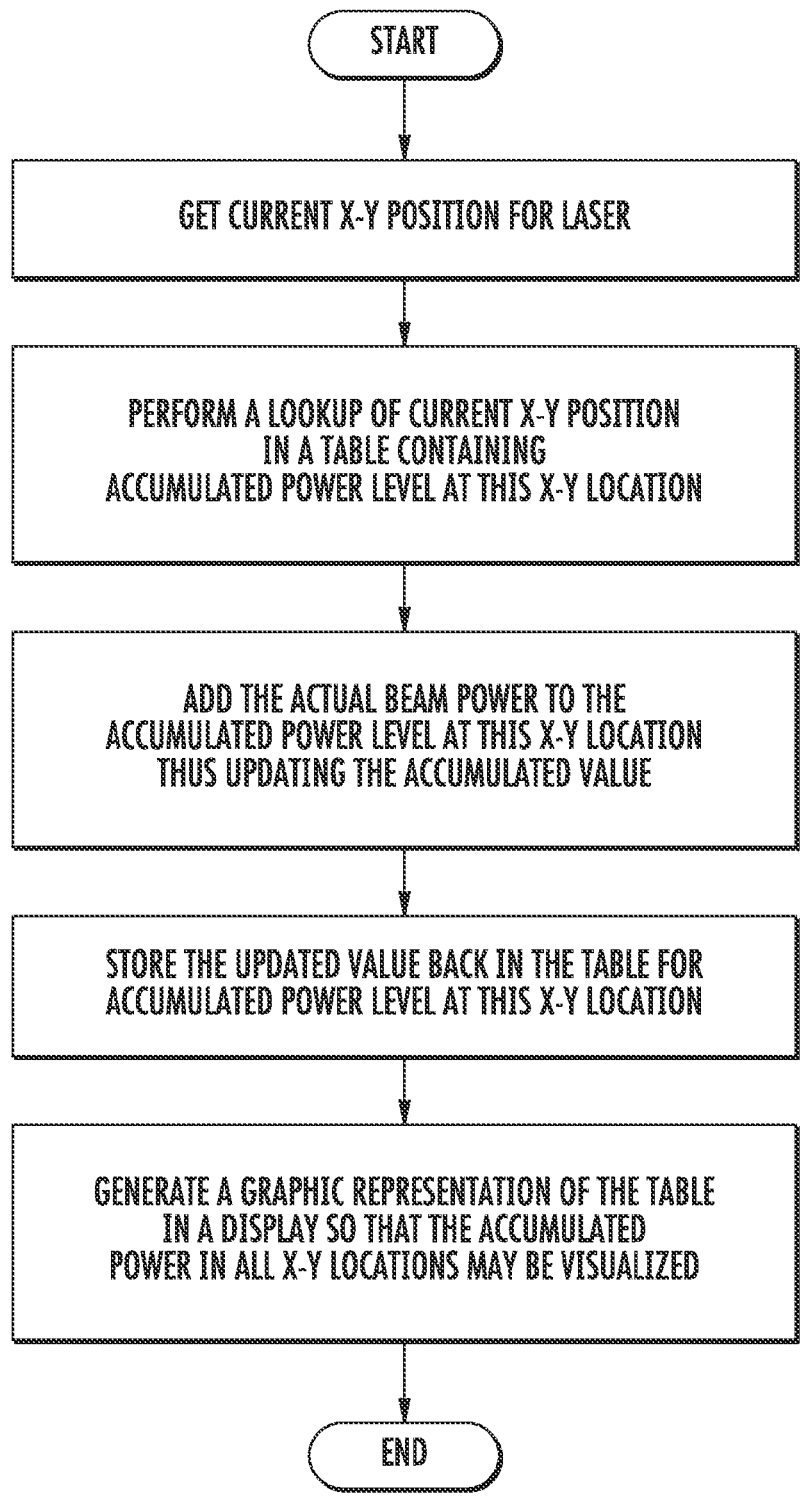
FIG. 9 is a flow diagram depicting a process for creating a visual display of accumulated beam power.
Figure 10:
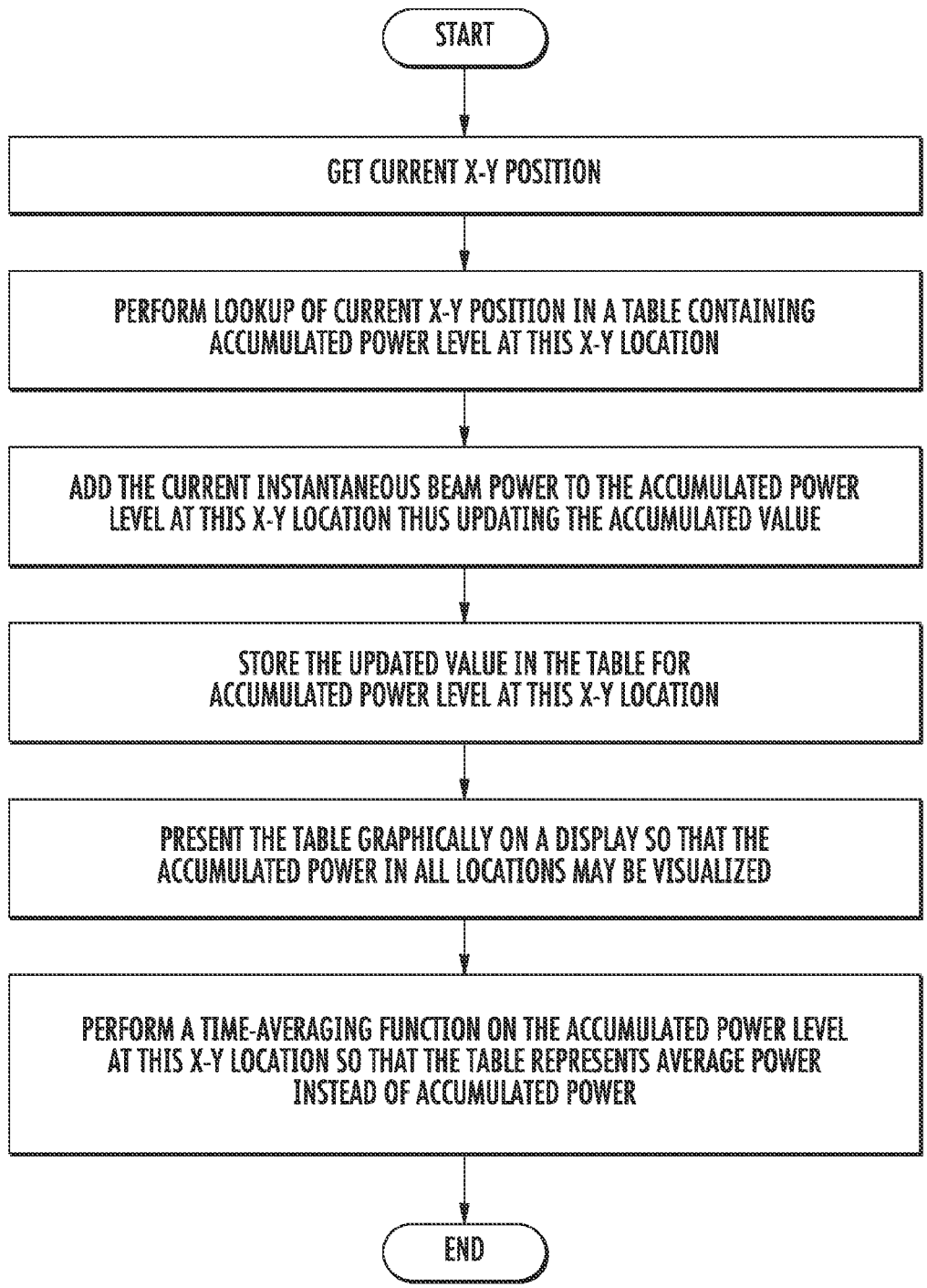
FIG. 10 shows a flow diagram of a process for generating a visual display of average beam power.
Figure 11:
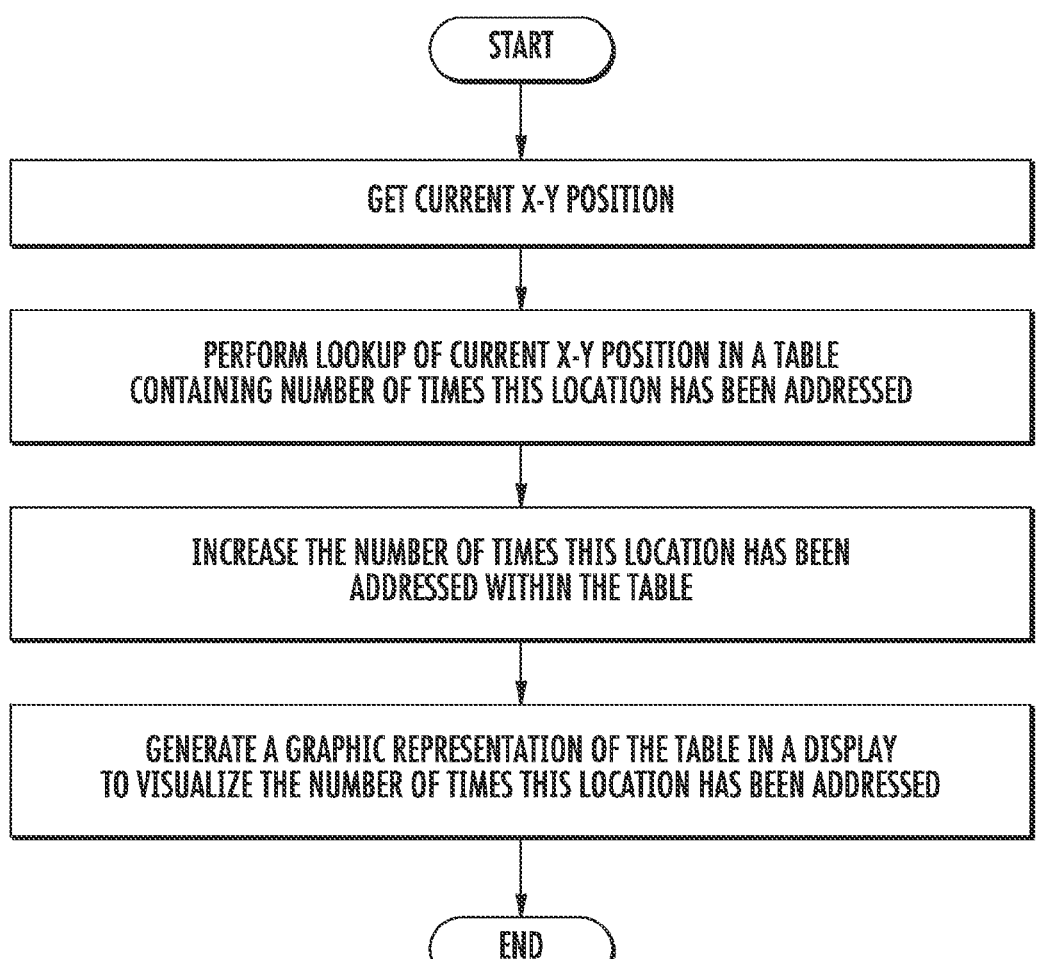
FIG. 11 depicts a process for visually displaying a histogram of scanned positions.
Figure 12:
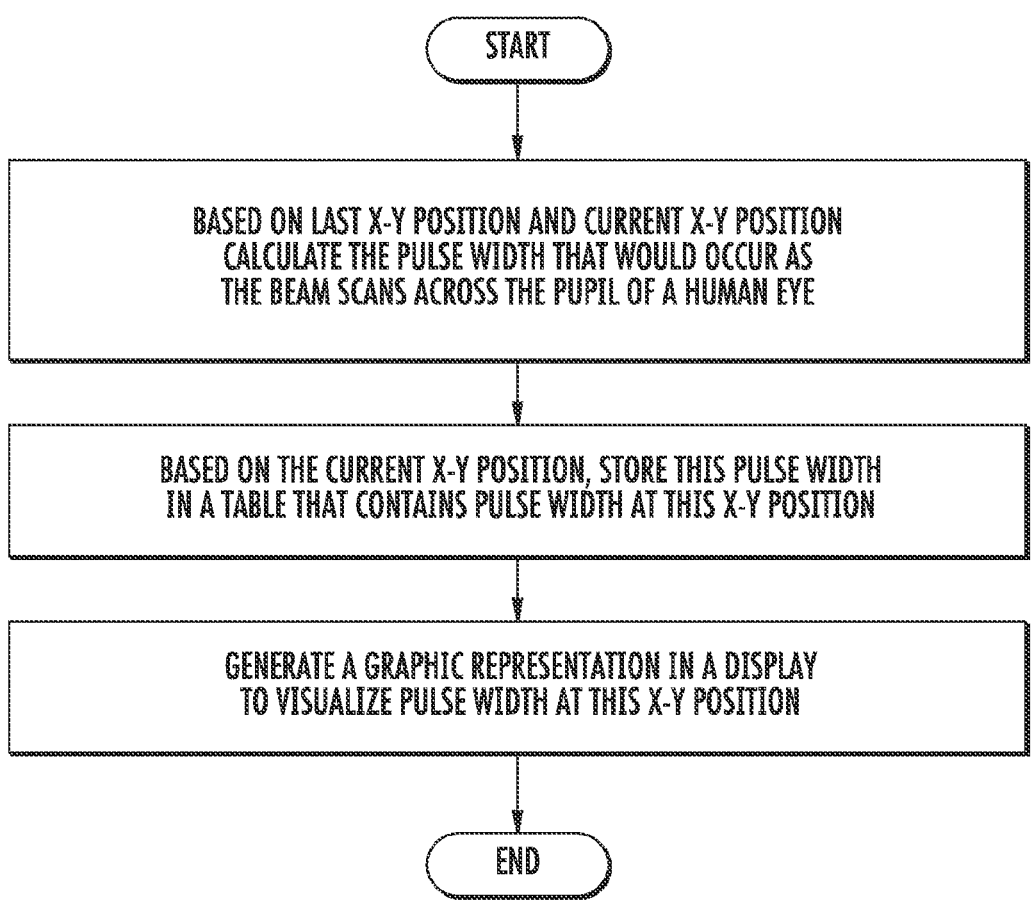
FIG. 12 illustrates a process for generating a visual display of pulse width at a predetermined X-Y position.

As noted above, the light beam is scanned using a pair of galvanometer scanners arranged to scan in an X-Y configuration. These galvanometer scanners provide a feedback "position signal" that is directly proportional to the X and Y beam position or angle of incidence currently used by each scanner. For the purpose of monitoring the X-Y beam position, these position signals may be appropriately scaled and then used as the direct measurement of X and Y Position of the light beam. For the purpose of monitoring the beam power, a sample of the modulated laser beam power can be taken using a beam splitter within the projector, so light is directed to a silicon photodiode, cadmium sulfide cell, or other similar detector means. The output from these devices serves as a scaled direct measurement of the power of the light beam. The position signals and measured beam power are schematically illustrated in FIG. 3.

Indirect Prediction of Beam Position and Power

As an alternative to the direct measurement discussed above, the command signals that are used to drive the galvanometer scanners may also be used to predict the X-Y beam position since the command signals and position signals should be almost identical in practice; any difference between these two should be negligible for eye-safety purposes. Likewise the command signals feeding the light beam modulators may be used to predict the beam power since the command signals and actual light output should be almost identical in practice. The only information needed in addition to the command signals is appropriate scaling information which indicates how many meters position signals correspond to, and how many Watts or Watts per square centimeter the beam power command signals correspond to. Within this invention, the beam power may be interpreted in terms of radiant power in Watts, or in terms of irradiance in Watts per square centimeter.

When predicting the beam power, it may be necessary to consider more than one command signal since it is possible that more than one laser may be used to form the total output beam. For example, red, green and blue lasers may be combined into a single beam which is then fed to the X-Y scanners. In this case, the red, green and blue beam power control command signals would be appropriately scaled and then summed to provide an indication of the total beam power. Alternatively, these three may be treated as three separate signal entities.

Note that if the beam position and beam power are indirectly predicted using the command signals as discussed above, the prediction may require the use of a digital "filter" since X-Y galvanometer scanners and beam power modulators have limited frequency response characteristics that are generally equivalent to a second-order Bessel filter. This Bessel filter can be implemented as a finite impulse response or infinite impulse response digital filter.

Also note that if the beam position and beam power are indirectly predicted using the command signals, these command signals may be observed in real time, or they may be pre-stored as numbers within a file or other storage mechanism.

Sampled Numeric Data

Whether direct measurement or indirect prediction is used, the beam position and beam power must be represented in a numeric form suitable for use by a computer algorithm. If the beam position and beam power are directly measured, then they must be "digitized" to provide this numeric form. Such a system is shown in FIG. 3. Note that the digitization process is done periodically, by taking samples of the beam position and beam power. The periodicity of digitization is called the sample rate. If the beam position and beam power are indirectly predicted, they are assumed to already exist in a digital numeric form, either pre-stored within a file, or directly generated by the programmable controller that will output the "command signals" samples for both the X-Y galvanometer scanners and the beam power modulators. The sample rate for either method would generally be in the range of 20 kHz to 400 kHz, with 30 kHz being the most common sample rate. Note that the beam position would usually exist in the form of X and Y coordinates since these ultimately drive, and are sampled from X-Y galvanometer scanners. However, it is possible for the beam position to be represented in the form of azimuth elevation, magnitude direction, or any other multi-dimensional coordinate scheme.

Figure 13:
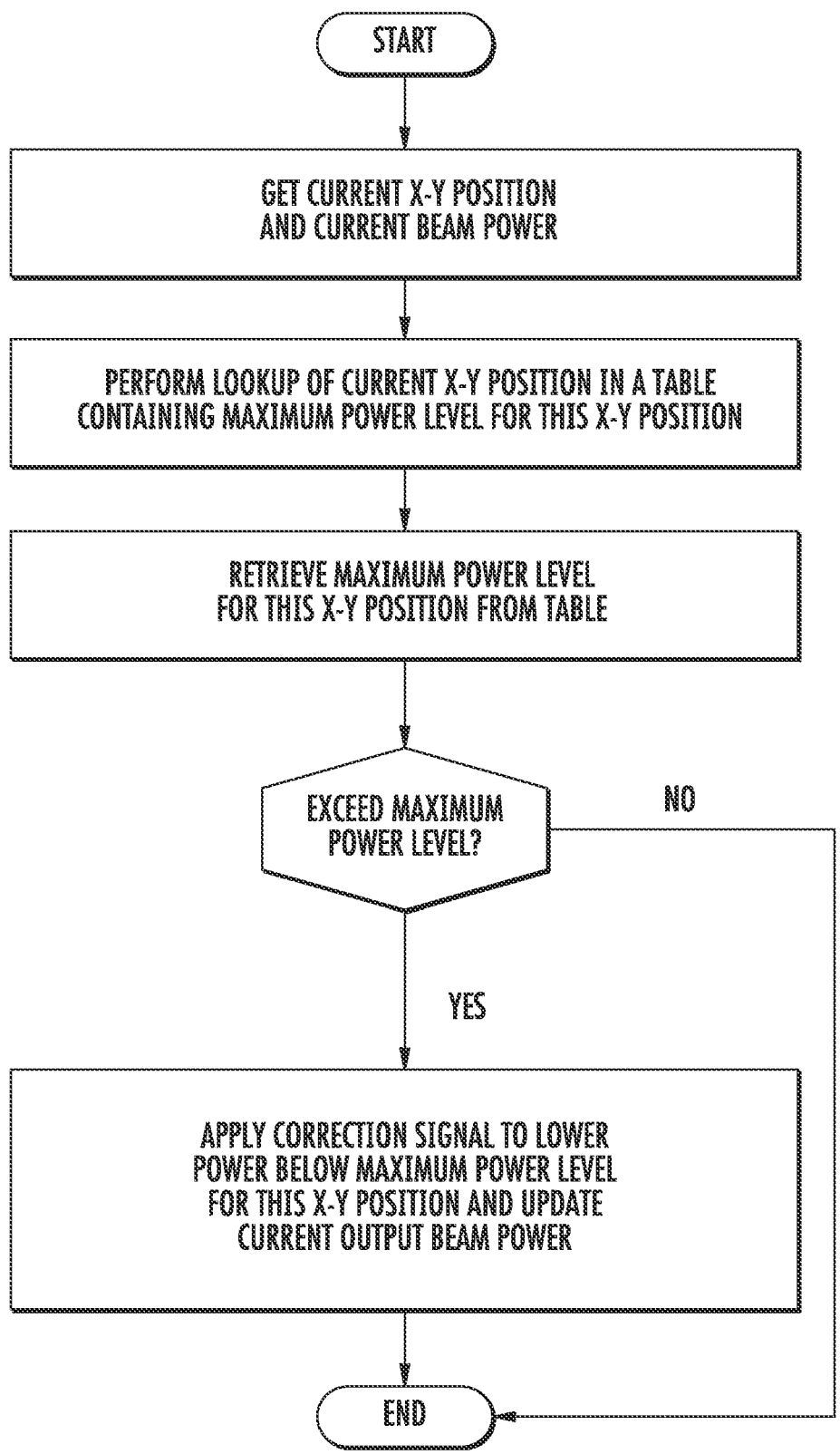
FIG. 13 shows a process for a simple beam power attenuation system capable of automatically limiting the instantaneous beam power based on X-Y position.
Figure 14A:
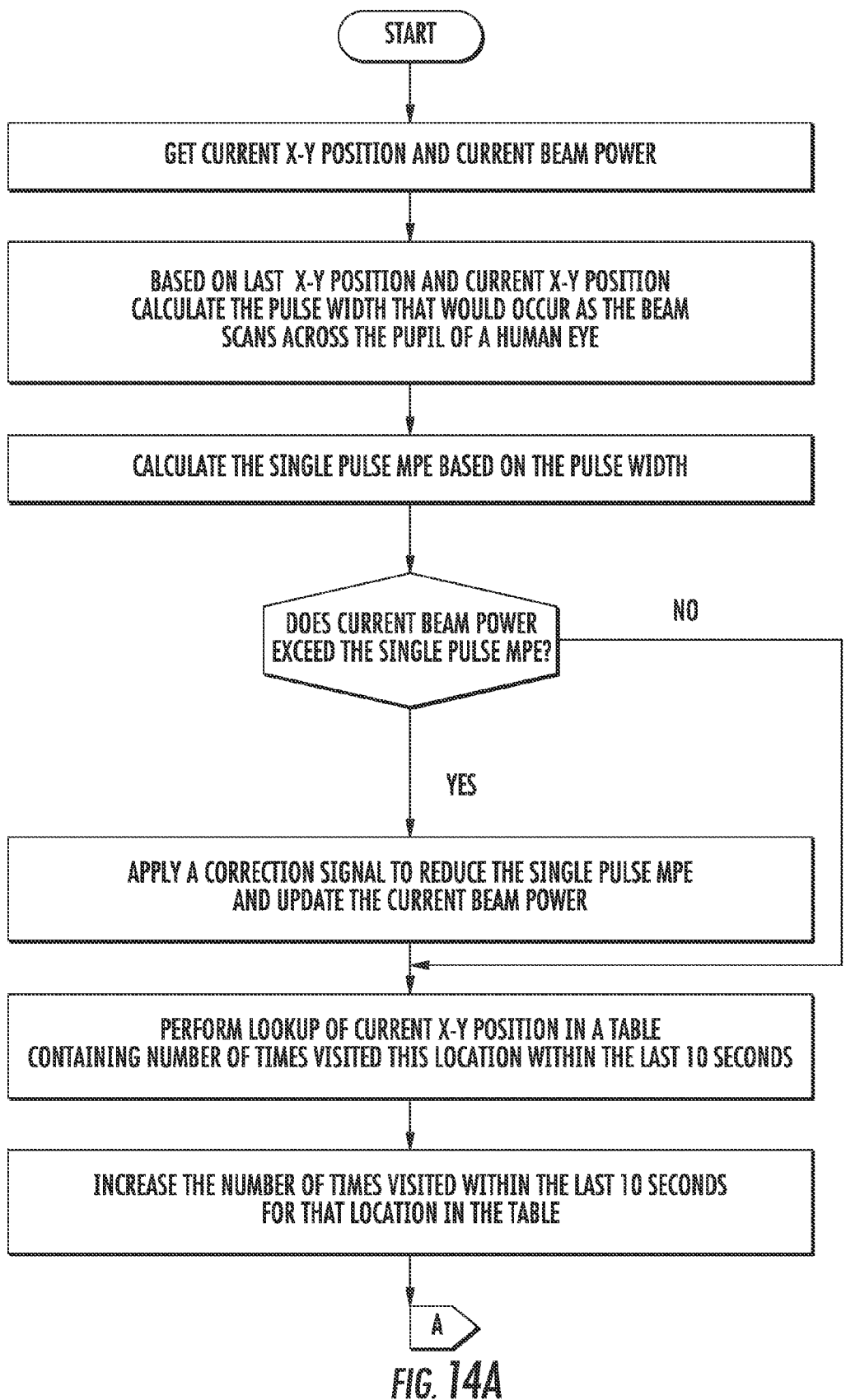
FIGS. 14A-14C (referred to herein as FIG. 14) is a flow diagram showing a process for creating a more complex beam power attenuation system capable of automatically limiting the instantaneous beam power based on the MPE levels and based on X-Y position.
Figure 14B:
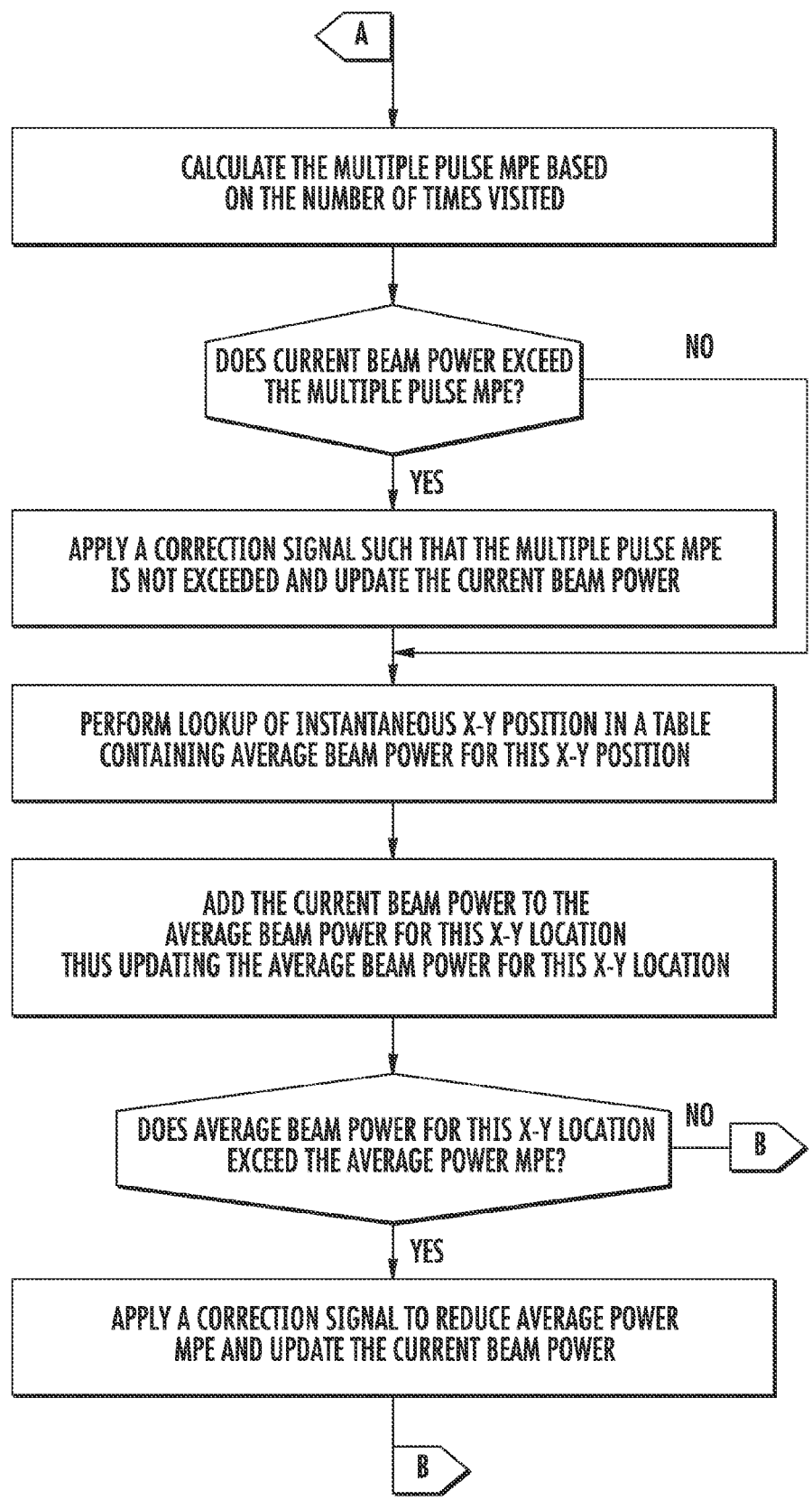
Figure 14C:
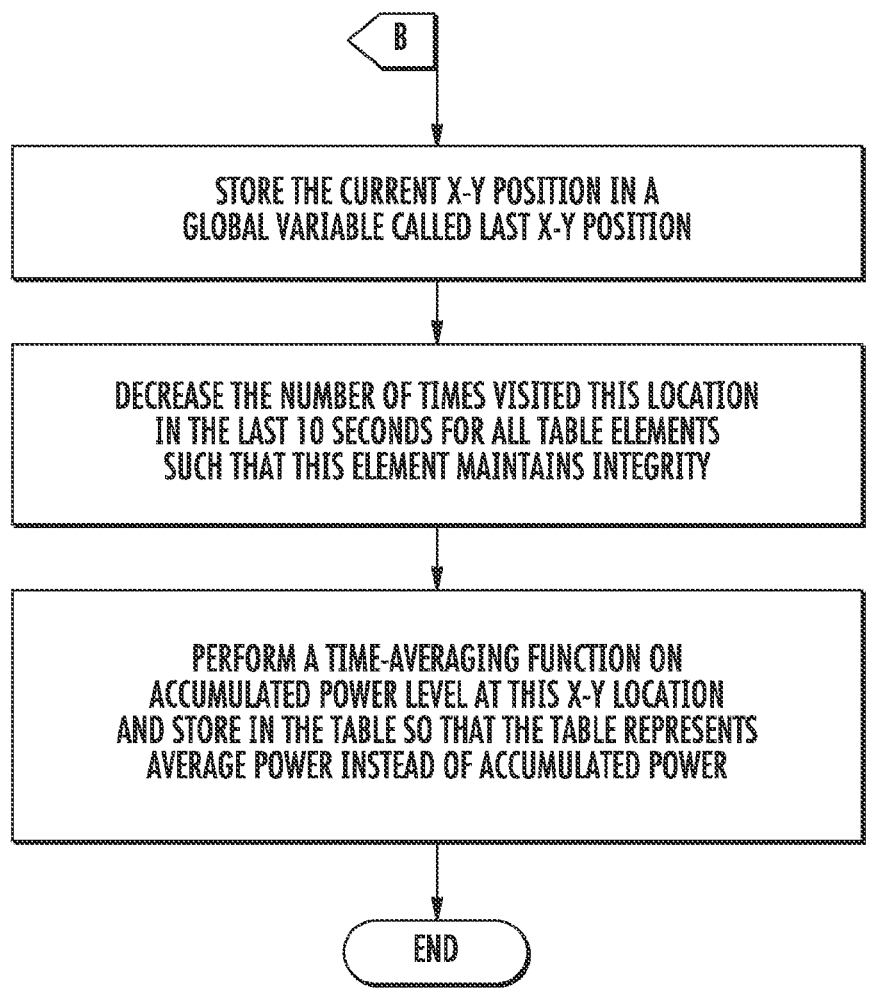

Once the beam position and beam power are known, and in numeric form, this invention can be used to produce a completely automatic system that will actively monitor the beam position and beam power, perform calculations based on this data, and if necessary, generate a correction signal that will reduce the beam power such that likelihood of audience injury due to eye exposure to the laser is significantly reduced. The steps needed to create this type of beam power attenuation system are illustrated in FIGS. 13-14.

In addition to the automatic system that monitors and possibly corrects the beam power, this invention may also produce a graphical display to aid an operator visualize the hazard potential of the beam. This graphical display preferably shows the entire X-Y scan field as a rectangular representation that is color coded or intensity coded. For example, the color green could represent a zone of safety, whereas yellow might represent a zone calling for increasing caution and red could represent a danger zone. Black, for example, could be used to represent areas from which the laser beam is absent. The display is preferably generated on a computer monitor and is based on calculations performed on the beam position and beam power level. Alternatively, the display could also be formed with LEDs. The display may be created as a separate process from the automatic system discussed in the last paragraph, or the display system may be an integral part of the attenuation system, where the display represents a visualization of the correction signal itself. A graphical display monitor is very instructive to operators, as it informs them when a hazardous scanning condition exists. Although the automatic system discussed above would reduce the beam power to a safe level automatically, this reduction may destroy the artistic intention of the scanning effect. Therefore, the operator of the system may use the hazard potential information shown in the visual display as a tool that helps discover whether or not it is necessary to re-program that part of the show so as to maintain or improve artistic integrity.

Use of a Bitmap

Note that in the case of both the visual beam power monitor and the intelligent beam power attenuation system, a data table is used to store the beam power levels and X-Y positions. This data table is preferably what is known in the art as a "bitmap"—that is, a rectangular area of memory, which is easily and directly addressed using the beam position coordinates.

Usually when describing a "bitmap", the term "pixel" is used to describe individual cells of the bitmap. In the art of computer graphics, bitmaps are used to generate computer graphics displays, where each pixel contains a color/intensity level at that X-Y location on a computer monitor. In the case of this invention, a bitmap is used in a novel and non-classical way to hold information about the maximum laser beam power desired, as well as historical trend information on the beam position and beam power level at each "pixel". The historical trend information is used along with the current beam position and beam power levels to determine whether or not a correction of the beam power is needed. It is also used to generate a visual display of the hazard potential or other scanning characteristics.

As noted above, the bitmap used in this invention comprises a rectangular array of memory. The number of pixels within this bitmap may be adjusted to the resolution requirements of the application, but will generally range from approximately 63 pixels horizontally by 63 pixels vertically, to approximately 1023 pixels horizontally by 1023 pixels vertically, with 255 pixels horizontally by 255 pixels vertically being used most often. A greater number of pixels may offer a higher-resolution representation of historical trends mentioned above, but this comes at the expense of the greater memory requirements needed to support the larger number of pixels.

Note that the preceding paragraph described the rectangular bitmap as having an odd number of pixels along each axis. However, using an odd number of pixels is not strictly necessary, but is desirable since it provides for a pixel which fully encompasses the center of the scan field. Also note that the preceding paragraph describes the number of horizontal and vertical pixels as being the same. This too is not strictly necessary, but it may ease the conceptualization and application of this invention since most often the scan field used by laser projectors is a square scan field. Use of an equal number of pixels also makes the user interface simpler, since the user may be required to only enter the width of the scan field instead of requiring both the width and height.

The skilled should recognize that, although the bitmap has been described as a rectangular grid addressed by X-Y beam position coordinates, it is also possible that the bitmap may be a spherical grid addressed by azimuth-elevation coordinates, or magnitude-direction coordinates (both of which may be referred to as polar coordinates). In reality, the bitmap is nothing more than an n-dimensional array of memory elements being addressed by beam position coordinates, no matter how those beam position coordinates are specified, and no matter how the memory elements are organized.

Size of Each Pixel

The present invention is primarily directed to laser projector safety, and especially to laser safety calculations as they pertain to the human eye. The MPE levels within safety standards are based on a dark-adapted 7 mm pupil diameter. As such, the spatial size of one pixel would preferably be at least 7 mm wide by 7 mm high. However, it may be desirable for the spatial size of one pixel to be much larger than 7 mm because, as viewers are experiencing an audience scanning show they will sometimes move their heads to avoid eye contact with the light when the shapes created by the scanning beam sweep past their eyes and face. In order to get a reliable count of the potential number of scans, and thus pulses a viewer has experienced, it is preferable to set the spatial size of a pixel to approximate the size of the viewer's head or "head space". If we use a spatial size of 100 mm for each pixel, this means that a 255 pixel by 255 pixel bitmap can represent an audience size of 25.5 meters wide by 25.5 meters high, with each pixel being slightly smaller than a viewer's head.

The spatial size of each pixel may be hard coded into an algorithm, or it may be specified directly by the user, or indirectly by the user inputting values that correspond to the horizontal and vertical size of the audience being evaluated.

When the user inputs values, the spatial pixel size can be found by dividing the horizontal size and vertical size by the number of pixels in the bitmap. For example, if the user inputs that the audience is 10 meters high and 10 meters wide, and the bitmap used is 255 pixels by 255 pixels, then the resulting spatial size is 10/255=0.039 meters, or 39 millimeters per pixel.

Addressing Pixels in the Bitmap

To address the pixels in the bitmap, the numeric value of the beam position coordinates (command signals or position signals) are used. At times, these beam position coordinates may have a different numeric range and resolution than the bitmap being used by this invention. For example, the X and Y beam position coordinates may be digitized to produce a 16-bit value, providing a 0 to 65535 numeric range for each axis. If the bitmap that is used has a resolution of 255 by 255 pixels, then the numeric value of the X and Y beam position coordinates must be scaled appropriately such that when a number that represents "far left" for the X beam position coordinate, this number will also represent "far left" in the bitmap. Likewise, when a number that represents "far right" for the X beam position coordinate, this number must also represent "far right" in the bitmap. This coordinate scaling for bitmap access is well known in the art of computer graphics and it is done with a simple multiplication and division: bitmap pixel coordinate=beam position coordinate*(number of bitmap pixels/numeric range of beam position coordinates).

Although bitmaps are referred to in the art of computer graphics as a "rectangular array of memory", in reality, there is no such thing as rectangular memory. Memory by its very nature only contains data elements and these elements are arranged in a linear fashion, starting at memory address 0, and working their way up to address N. Therefore, when an X and Y beam position coordinate is addressing memory organized as a rectangular bitmap structure, the X coordinate is used directly, but the Y coordinate must be multiplied by the number of X elements in the bitmap. For the purposes of addressing an X-Y pixel element within a bitmap, the formula to convert the X-Y address to a linear memory address is: linear memory address=X coordinate+(Y coordinate*number of X pixels). With that in mind, the term "bitmap" may then also be used to describe any multidimensional memory scheme in which the beam position coordinates serve as the addressing mechanism.

Note that the division and multiplication scheme of memory and bitmap addressing described in the last two paragraphs may not result in a whole number. For example, if 16-bit X beam position coordinate numeric value is 29864, and the bitmap being used contains 255 horizontal pixels, the resulting X pixel coordinate would be 29864*(255/65536) =116.2. In other words, 116 whole pixels plus a 2/10 fractional pixel. Since the bitmap only contains whole pixels and has no sense of fractional pixels, it is customary that the fractional component of the pixel coordinate is simply ignored. In fact, it can be demonstrated mathematically that many X beam position coordinates will result in the same X pixel coordinate of 116, with some fractional pixel component. The problem of "many input coordinates pointing to the same whole bitmap pixel" is called "pixel aliasing" and this is well known in the art of computer graphics.

In some computer graphics applications, "pixel aliasing" may be undesirable since it sometimes results in images looking rough or jagged. However, in the present invention pixel aliasing may actually be beneficial since it guarantees that multiple close scans of the laser beam will usually be resolved to the same bitmap pixel, thus helping to reinforce the application of this algorithm in the context of "head space" mentioned above. Even if a close scan of the laser were resolved to a pixel adjacent to pixel coordinate 116, this would not be detrimental in the context of the invention, since it would mean that such a scan was necessarily in a different location and thus, most probably scanning across a different eye-position or different viewer. However, it is possible to completely resolve the problem of fractional pixels using a technique called "anti-aliasing." When anti-aliasing techniques are used, multiple pixels are addressed using a single beam position coordinate, with a weight given to up to four pixels, each weight being based on the fractional component of the pixel address. The concept of anti-aliasing and the way that it is applied is well known in the art of computer graphics.

It will be appreciated by those skilled in the art that the use of a bitmap as disclosed in the present invention simplifies the task of safety evaluation, since the far left of the audience represents far left in the bitmap, and the far right in the audience represents far right in the bitmap, and also since the resolution of the data extracted is solely dependent on the resolution of the bitmap itself. To evaluate a show of any complexity and for any show length of time, only a few basic and readily measurable parameters are needed from the operator, and regardless of the length of time or size of the bitmap, no changes in the method are ever required.

Quantities Stored in, and Retrieved from the Bitmap

For typical bitmaps used in computer graphics, the data elements stored in each pixel, and retrieved from each pixel location correspond to the desired brightness level of each pixel. These brightness levels may be of three separate colors (red, green and blue) and may also include a transparency (alpha) value. A computer program stores desired brightness levels into this bitmap, and later, when it becomes necessary to display the data on a computer monitor, the computer monitor will "scan" (retrieve) each bitmap pixel location and output the red, green and blue values to the Intensity signals on a computer monitor. In most cases the transparency (alpha) value is not used directly by the computer monitor itself, but instead may be used by computer graphics programs that are storing the red, green and blue brightness level data into the bitmap. For example, a computer program that is about to store a red/green/blue brightness level into the bitmap may first read the current transparency level for that pixel, use this transparency level to perform a calculation on the red/green/blue brightness level that is about to be stored, and then finally store the red/green/blue brightness levels into the pixel location.

For laser safety evaluation in the context of audience scanning, it is preferable that several data elements be stored in each pixel location of the bitmap. These data elements will generally include the following:

total accumulated beam power at this pixel;
average beam power at this pixel;
total number of times this pixel has been scanned;
average number of times this pixel has been scanned;
time when this pixel was first scanned by the beam;
time when this pixel was last scanned by the beam;
pulse width experienced at this pixel; and
maximum power allowed at this pixel.

The "total accumulated beam power at this pixel" is computed by simply adding the instantaneous beam power to the current value stored in the "total accumulated beam power at this pixel". This value may be used to monitor and visualize the total power delivered in each area of the audience. This data element may also consist of separate data elements for red, green and blue beam power, if it is desired to monitor and attenuate these separately.

The "average beam power at this pixel" is related to the "total accumulated beam power at this pixel", in that it represents a beam power that is accumulated over time, and it is calculated using the instantaneous beam power as an input. However, the "average beam power at this pixel" requires an additional level of computation in order to produce a value that represents an average over time. This may be calculated using any number of techniques known in the art of computer programming for calculating a running average, but one simple and effective method is to use what is known as a "leaky bucket" technique, whereby the value stored in this location is periodically decreased by a small predetermined amount, and where the periodicity of this action and the amount of decrease controls the amount of time that is used for the averaging function. This value may be used to monitor and visualize the average power that is being delivered to each area of the audience, and this value may also be used for the purposes of "average MPE" calculations. These data elements may also include separate data elements for red, green and blue beam power, if it is desired to monitor and attenuate these separately.

The "total number of times this pixel has been scanned" is computed by simply incrementing this value each time the X-Y pixel coordinate enters this location. In a similar way that the "total accumulated beam power at this pixel" may be used for visualization purposes, this value may also be used for visualization purposes to illustrate the frequency with which the beam is directed to this part of the scan field. This value may also be used for the purposes of "multiple pulse MPE" calculations.

The "average number of times this pixel has been scanned" is computed in a similar way as the "total number of times this pixel has been scanned" and the "average beam power at this pixel", whereby this value is increased each time the X-Y pixel coordinate addresses this location, and some averaging function is used to produce a time-averaged value. As with the "total number of times this pixel has been scanned", this value may be used for the purposes of visualization, and also for the purposes of "multiple pulse MPE" calculations.

The "time when this pixel was first scanned by the beam" and "time when this pixel was last scanned by the beam" are not really computed values, but instead these locations are used to store the "time" value when the X-Y coordinate addressed this pixel location. These "time" values may be represented in microseconds, milliseconds, samples, or any other form that is convenient to be observed and consumed by the invention. These time values may be used to form a visual display, or they may be used to aid in the calculation of the pulse width, as required for "single pulse MPE" and "multiple pulse MPE" calculations.

The "pulse width experienced at this pixel" is the calculated pulse width experienced at this pixel location. Note that, depending on the implementation of the algorithm, this may represent the time it takes for the beam to enter, and then leave the actual pixel's X-Y location (i.e. truly the pulse width experienced by the pixel), or it may be a calculated value of the pulse width experienced by any 7 mm pupil within the region of this pixel. Since all of the laser safety standards are based on a 7 mm eye pupil, the pulse width across a 7 mm pupil must be known at some point in order to perform the "single pulse MPE" evaluation.

The pulse width experienced by a 7 mm pupil may be calculated in one of several ways. One easy way is to use the actual pulse width experienced by the pixel, and then multiply this number by the ratio of 7 mm as compared with the current pixel spatial size. For example, if the pixel spatial size is 39 millimeters, and the pulse width experienced by the actual pixel is 1000 microseconds, then the pulse width experienced by a 7 mm pupil would be 1000*(7/39)=179 microseconds. Depending on the implementation, this figure may need to be further modified by considering the beam diameter.

One other way to calculate the pulse width is by using the beam velocity, and calculating the pulse width from this beam velocity as it scans across a 7 mm pupil. This beam velocity can be calculated by using multiple beam position samples. If this invention is being applied in real time, it is possible that the algorithm may not have access to past or future beam position samples, only to the current beam position sample. In this case, the invention would make handy use of a global variable to store the value of the beam position in a variable called "last beam position". In this way, for each data sample, the algorithm could subtract the current beam position from the last beam position and find the difference (length).

The "maximum power allowed at this pixel" may be used as an additional form of control over the beam power. This may be used to allow the beam power to be higher than the safety calculations allow, if the user has areas where they know there will not be viewers present (i.e. to allow a higher power over the head of the audience). Or it may be used to reduce the amount of power regardless of the results of the safety calculations (i.e. to forcibly reduce power to zero in very sensitive areas). This data element may or may not be used, depending on the complexity of the user interface and the application, but if used, this data element would be input by the user, and usually specified by using a tool like a paint program on a computer, allowing the user to specify (by painting) appropriate power levels for each pixel. This data element may also consist of separate data elements for red, green and blue beam power, if it is desired to monitor and attenuate these separately.

Depending on the application, it may be desirable to store other data elements in each pixel location. Some examples include total accumulated pulse time (sum of all pulse widths experienced by the pixel), average pulse width, maximum number of times this pixel has been scanned within a 10 second period of time, last correction signal applied at this pixel, etc. It may also be desirable to compute and store these data elements for the purposes of monitoring and visualization, or for attenuation, depending on the application.

Correction Signal

Once the beam position and beam power are known, the algorithm processes this information by computing and storing data elements at each pixel location as described above, and also by performing comparisons to see if the current beam power is above a threshold which is determined either by the maximum power allowed at this pixel data element, and/or by performing safety calculations based on the pulse width-, number of pulses-, and average power-related data elements found at that pixel location. If the current beam power is above the threshold, then a correction signal is calculated. This Correction Signal is proportional to the amount by which the beam power must be reduced.

Once the correction signal is calculated, it may be applied directly (mathematically) to the beam power before it is output by the programmable controller (if the algorithm is an integral part of the software within the programmable controller) or this correction signal may be output as a separate electrical signal or data element which may be used to control the laser projector. As with beam power related data elements, the correction signal may consist of separate values for red, green and blue, if it is desired to monitor and attenuate these separately.

Note that, depending on the implementation of the software and programming language used to implement the invention, the correction signal may not exist in the form of an explicit variable, but instead may be implicit within the expression that applies the correction. Examples of each form are shown below:

Example of how the correction may be applied implicitly
  If beam power>maximum power allowed at location
  then beam power=maximum power allowed at location Example of how the correction signal is computed and applied explicitly
  Correction signal=beam power−maximum power allowed at this location
  if correction signal<0 then correction signal=0
  beam power=beam power−correction signal Also note that, although it is preferred that the correction signal be applied to the beam power at each pixel and each numeric data sample interval, it is also possible that the correction signal may be applied to numerous pixels and/or over numerous data sample periods. When the correction signal is applied in this way, the visual result would be that the power of the entire projected image is reduced in an area, instead of just one small part of the projected image.

Monitoring and Visualization

In addition to the automatic beam power attenuation system described above, the present invention may be used to create a monitor to visually display any of any of the parameters in the bitmap. For example, the visualization may use the average beam power-related data element of each pixel in the bitmap to produce a visual representation on a display screen. This representation or visual display might indicate a predetermined color, for example, green, if the average beam power is sufficiently low so it would not create a hazard. A second color, perhaps yellow, would indicate that the average beam power is nearing the point of a hazard. Finally, a third color, possibly red, would indicate that the average beam power is hazardously high. Note that the average beam power is a very valuable data element for this purpose since it will be illustrative of energy concentrations within the scan field. Other data elements in the bitmap may also be monitored and visualized in a similar fashion. For example, the visualization may use the pulse width-related data element of each pixel to produce the visual display, where green represents a very short pulse-width, yellow represents a medium-length pulse width, and red represents a very long pulse-width. Another example would be to monitor and visualize the correction signal itself, where green represents no correction, yellow represents a moderate correction, and red represents a significant correction.

The visual representation can be generated in a display screen or computer monitor by evaluating data stored in each pixel in the bitmap described in this invention, performing the necessary conditioning based on the data (example, green-yellow-red) and then placing this conditioned information onto the display screen. Since computer monitors are based on the concept of bitmaps, it will be appreciated that this monitoring and visualization operation is not much more complicated than transferring information from storage in the bitmap of this invention, to display on the bitmap of a the screen display.

Note that the specific bitmap data elements as well as the green-yellow-red color scheme mentioned above is meant only as exemplary for conceptualizing the invention only, and is not intended to be a limiting factor in this invention. Any one of the data elements stored in the bitmap, or even combinations of data elements may be used to create the displayed visualization, and the visualization may be implemented as any color or intensity scheme.

Initializing Bitmap Data

Before the invention is to be applied, all data elements stored within the bitmap must be initialized to default values, so as to not give any false results during operation. This initialization is similar to the way in which a bitmap is cleared to black, or to white, by a computer graphics program. For the purposes of this invention, almost all data elements can be set to zero during the initialization process. The only data elements that need to be set to a non-zero value would be those data elements associated with the maximum power allowed at this pixel. These data elements would need to be preset as desired by the user. All of these data elements may be set to the same value, or this data element may be set differently in each pixel.

The invention will now be described with particular reference to the figures. The invention discloses a projection system 1 for projecting beams and patterns of light into an audience of viewers 19. In all embodiments, the projection system 1 includes a programmable controller 4, which produces X-Y beam position coordinates 6 and beam power coordinates 5. These coordinates are produced by reading image data from a file 2, or by synthesizing these coordinates by executing an algorithm to generate abstract imagery 3, or by some combination of the two.

Figure 1:
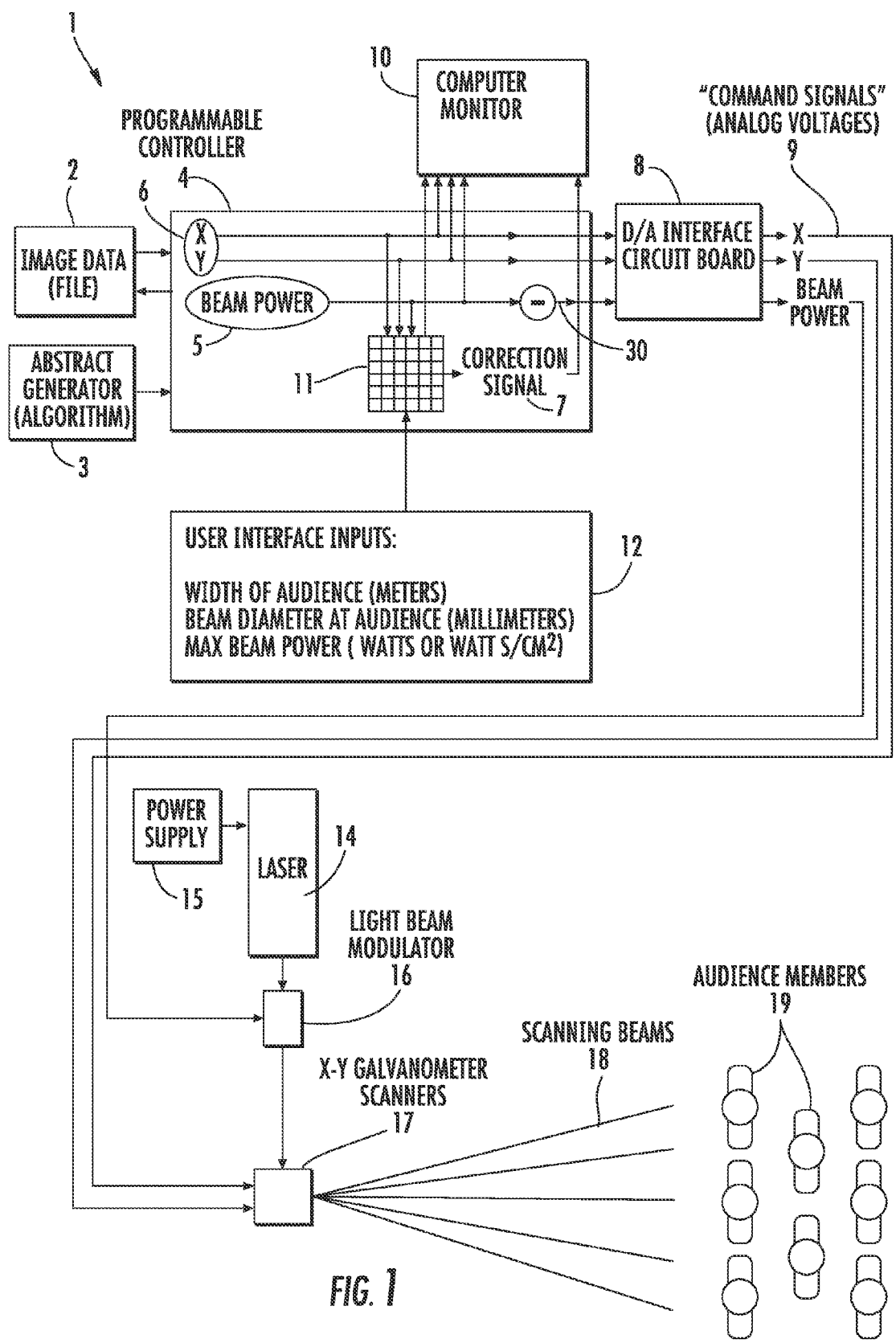
FIG. 1 illustrates an audience scanning projector according to an embodiment of the present invention.
Figure 2:
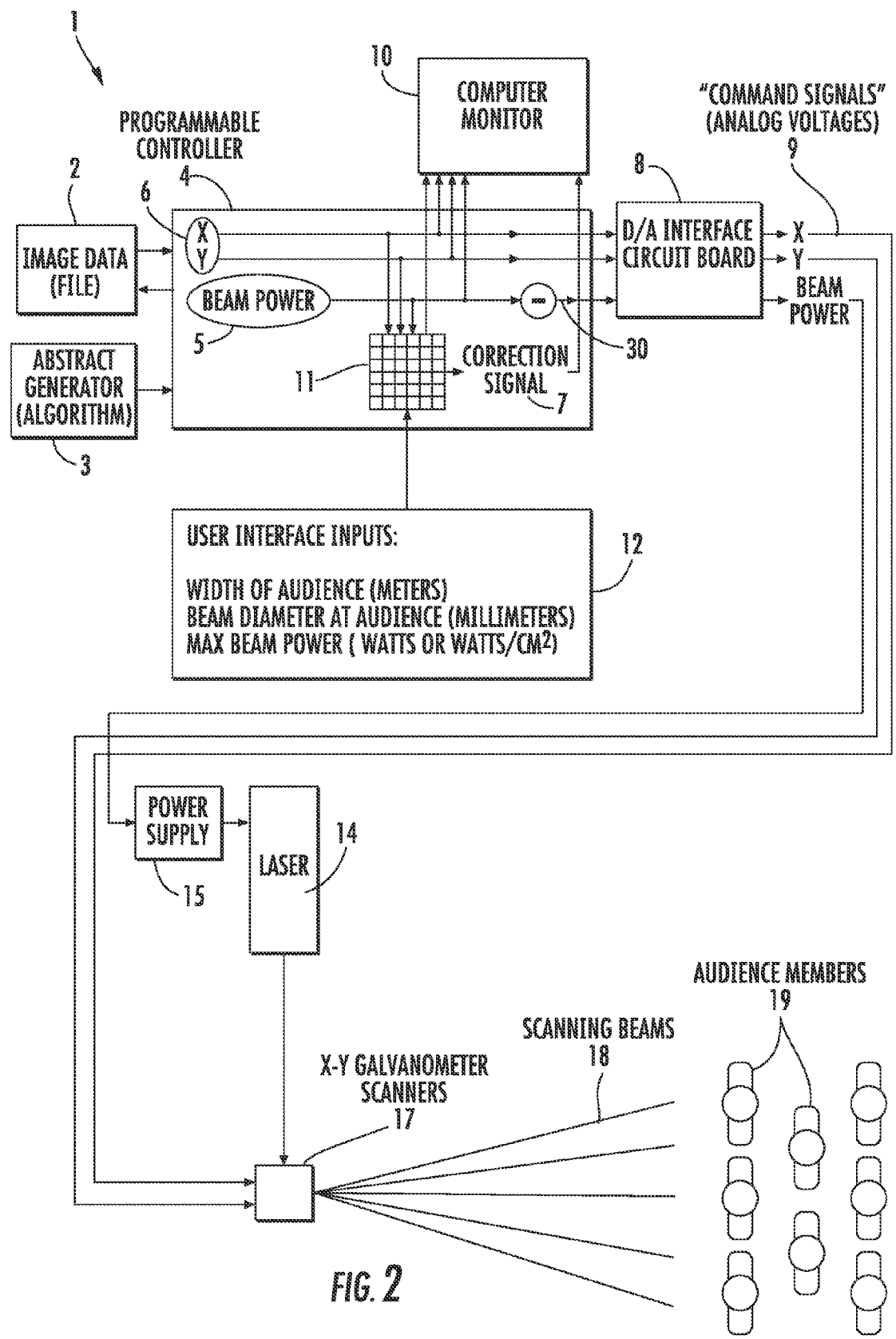
FIG. 2 shows another embodiment of the present invention.

In the embodiment shown in FIGS. 1-2, the X-Y beam position coordinates 6 and beam power coordinates 5 are in a digital numeric form, suitable for processing by software resident in a computer. The X-Y beam position coordinates 6 are scaled based on the width of the audience information supplied by the user Interface input 12, and then used to address data stored in table of data elements 11. The data elements, including information related to the maximum power allowed at that X-Y location, as well as information related to the number of times that data element has been addressed, and accumulated beam power at that X-Y location. The programmable controller 4 processes these data using a software program which determines if the beam power coordinate 5 exceeds the maximum power allowed at that location. If it does, then, responsive to the determination, a correction signal 7 is generated and applied to the beam power coordinate 5, resulting in corrected beam power 30. The programmable controller 4 sends the X-Y beam position coordinates 6 as well as the corrected beam power coordinate 30 to a digital to analog Interface 8, which supplies command signals 9 to the scanning and light modulation systems described below.

In the embodiment shown in FIG. 1, the beam power portion of the command signals 9 is fed to a light beam modulator 16, which modulates the light beam from the laser 14. In the embodiment shown in FIG. 2, the beam power portion of the command signals 9 is fed directly to the laser power supply 15 which then directly modulates the power of the laser.

In both embodiments shown in FIGS. 1 and 2, the X-Y beam position portion of the command signals 9 is fed to an X-Y scanning system 17 which produces scanning beams 18 in the direction of the viewing audience 19.

Thus, a difference between the embodiments shown in FIGS. 1 and 2 resides in the process for modulating the light beam. FIG. 1 shows an embodiment in which the light beam is modulated by a light beam modulator 16. Such would be the case when the laser 14 is producing a continuous light output as, for example, in a gas laser. FIG. 2 shows an embodiment in which the light beam is modulated by its own power supply 15. An example of this type of embodiment would be a solid state laser.

FIG. 3 discloses a completely different approach. In the case of FIGS. 1 and 2, the programmable controller monitors the beam power coordinate information and generates the command signals. In the embodiment of FIG. 3, the monitoring software resides external to the programmable controller and runs on a completely separate processor. In such an embodiment, programmable controller 4, produces X-Y beam position coordinates 6 and beam power coordinates 5 by reading image data from a file 2, or synthesizes these coordinates by executing software to generate the abstract imagery 3, or by some combination of the two. The programmable controller 4 does not generate or apply any correction to the beam power and instead, it sends the X-Y beam position coordinates 6 as well as the beam power coordinates 5 directly to the digital to analog Interface 8, which supplies command signals 9 to the X-Y scanning system 17 and to the correction signal application circuit 30. Light produced by laser 14 passes through light beam modulator 17 and is measured by the photodetector 22 by virtue of a beam splitter 21. This results in measured beam power signal 23. The measured beam power signal 23 and the measured position signals 24 from the X-Y scanning system 17 are directed to a digitizing system 25 which periodically digitizes the signals and converts them to digital numeric form required for the algorithm of this invention. The X-Y beam position coordinates portion of 26 are scaled based on the width of the audience information supplied by the user interface input 12. They are then used to address data stored in table of data elements 11, the data elements including information related to the maximum power Allowed at that X-Y location, as well as information related to the number of times the particular data element has been addressed in the past, and accumulated beam power at that X-Y location. Processor 27 processes these data through software which determines if the beam power portion of 26 exceeds the maximum power allowed at that location. If it does, then a correction signal 7 is generated and applied to the beam power portion of command signals 9 using an electronic circuit 20, resulting in a corrected beam power signal 30.

In all embodiments, a variety of possible visualizations are shown on a display 10. This visual representation is generated using the X-Y position coordinates 6, the corrected beam power coordinates 30, and other information found in the table of data elements 11. The visual representation shows the X-Y scan field in the form of a rectangular display, with green portions of the visualization indicating complete safety, yellow portions indicating impending hazard, red portions indicating severe hazard and black portions indicating that no laser light has entered that area. Processes for generating the visual display are shown in the flow diagrams of FIGS. 9-12.

The present invention may be partially or fully embodied within a computer algorithm. As input, this algorithm requires the beam position and beam power, as well as spatial-related information, including the size of the audience, beam diameter, and possibly beam power scale factor (if indirect prediction is used). The algorithm processes these data, generates correction signal, and applies this correction signal to the beam power. As mentioned above, in one possible embodiment, this correction signal is applied directly to the beam power "command signals" that are generated by the programmable controller and then these command signals are output to the laser projector. In this manner, the programmable controller will never output command signals which would result in an unsafe exposure. The technique is shown in FIGS. 1 and 2. In yet another embodiment, the invention may be embodied as two separate components, whereby one component calculates and generates the correction signal, and a separate component performs the beam power attenuation process. The second device may be another beam power modulator, or it may be an electronic circuit which modifies the original beam power "command signals" based on additional criteria. This approach is shown in FIG. 3.

In the description, the invention was characterized in the context of using the beam position (or sampled position signal) coordinates to address a memory table, the table preferably being implemented as a bitmap-like memory structure. However, this table may also be constructed using linear arrays, since bitmaps themselves are essentially linear arrays. The table may also be implemented as a linked list or double-linked list or other types of table structures which are well known in the art of data processing, provided that there is an adequate method of identifying data elements within the table using the beam position coordinates. This table may also be implemented as a multi-dimensional array whereby not only the beam position coordinates, but also the beam power may be used as a table-addressing coordinate.

The skilled will recognize that the present invention has also been described in terms of a bitmap for the purposes of ease of understanding and conceptualization, since some of the operations performed on the table are similar to that of operations performed on a bitmap used in computer graphics. However, it should be appreciated that the information stored in the table, as well as the fact that the table is being accessed by laser beam positions in a vector manor (not a raster manor as with computer graphics), as well as the reason for using such a table, and finally the information gained by the table, are all completely different from any computer graphics application and are specific to the use of evaluating radiant energy beams that are scanned and projected. Moreover, unlike computer graphics where all table elements must be evaluated to produce a picture, this invention provides that only those table elements that are identified periodically by beam position coordinates may be accessed and modified. It is not necessary to analyze all data elements in the table for the purposes of this invention. Likewise the foregoing description of pixels is intended to aid in the conceptualization of this invention. Pixels may actually be considered "regions", with each region generally being the size of a pupil of a human eye or larger.

References have been made herein to a laser beam and the use of the present invention to aid in preventing an unsafe or undesirable exposure level of the laser beam to human viewers in an audience being intentionally scanned. However, it should be appreciated that the principles embodied in the invention may also be used in other types of radiant energy beams, and applications where it is desirable to prevent an undesirable level of exposure, particularly if such exposure results in a build-up of power that results from a radiant energy beam repeatedly being directed over a scanning area. Such applications include fiber optic switching and selection, materials processing, and flying aircraft avoidance for "guide star" lasers used in astronomy, or even aircraft avoidance for search lights.

Although reference has been made to the concepts of MPE embodied within well-known and published laser safety standards including IEC 60825-1 and ANSI Z136.1, this invention can be easily adjusted to accommodate the requirements of other safety standards or beam power limiting requirements. Some of these adjustments may include removing the single-pulse MPE and multiple-pulse MPE calculations and performing calculations only on the basis of average beam power. This would especially be the case in fiber optic switching and material processing applications. Other possibilities include basing the evaluations and calculations purely on the average or total number of times that the beam scans across each pixel or region (total number of pulses).

Although the previous discussion of this invention has mainly been in the context of a real-time implementation, where the invention is used to evaluate and instantly correct data samples generated by a programmable controller, or those obtained by directly digitizing X-Y beam position and beam power level signals from a laser projector, this invention may also be used to evaluate and correct prestored data samples as well. In this case, the pre-stored data samples would be samples of the beam position and beam power, stored within a file or other storage means. Such a file is shown in FIGS. 1-4. When applied in this manner, the correction signal may be applied directly to correct the data and then store the corrected data. Alternatively, the correction signal may be stored itself as a separate entity that may be applied later, when the prestored data is consumed.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A method of controlling beam power of an X-Y vector scanning light beam provided by a projector forming an image viewable in mid-air and being projected into a projection area including a viewing audience, the method comprising the steps of:
    projecting a scanning light beam into the projection area including a viewing audience, wherein at least some members of the audience are looking directly toward the projector projecting the scanning light beam;
    accessing a data table, the data table including:
        a spatial grid representing at least a portion of the projection area over which the scanning light beam is to be projected, the spatial grid comprising a plurality of regions having spatial coordinates correlated to the projection area; and
        a maximum permissible light level for at least some of the regions correlated to a portion of the projection area available to the viewing audience;
    receiving the spatial coordinates of an instantaneous X-Y beam position on the spatial grid;
    correlating the received spatial coordinates with a respective region in the data table;
    receiving a beam power of the scanning light beam;
    comparing the received beam power with the maximum permissible light level at the respective region; and
    if the received beam power exceeds the maximum permissible light level at the respective region, issuing a signal indicative thereof.

2. The method recited in claim 1, wherein at least some of the spatial grid regions comprise a size at least 7 mm by 7 mm.

3. The method recited in claim 1, wherein at least some of the spatial grid regions comprise a size no greater than 100 mm by 100 mm.

4. The method recited in claim 1, wherein:
    the spatial grid is divided into a first portion of regions for containing a plurality of humans and a second portion of regions wherein the plurality of humans is not expected to reside, wherein both portions of regions are predetermined and fixed by a user; and
    the maximum permissible light level for the first portion of regions is less than the maximum permissible light level for the second portion of regions.

5. The method recited in claim 1, wherein the data table further has stored therein, for at least some of the regions, at least one of total accumulated beam power, average beam power, total number of times the region has been scanned, average number of times the region has been scanned; a time at which the region was first scanned, a time at which the region was most recently scanned; and a pulse width experienced at the region.

6. The method recited in claim 1, wherein the data table further has stored therein, for at least some of the regions, a pulse width experienced at the region, the pulse width comprising at least one of:
    an elapsed time between a beam entering the region and the beam leaving the region; and
    a pulse width experienced by a human eye pupil having a predetermined size, as calculated from a velocity of the beam scanning across a human eye pupil having a predetermined size.

7. The method recited in claim 1, wherein the beam power and spatial coordinates receiving steps comprise at least one of a direct measurement of the beam power and spatial coordinates and a prediction of the beam power and spatial coordinates based upon a calculation from a command signal controlling the scanning light beam.

8. The method recited in claim 1, wherein the beam power and spatial coordinates receiving steps comprise receiving data from a position signal provided by a scanner controlling the scanning light beam and a beam power level provided by a direct sampling of the scanning light beam.

9. The method recited in claim 1, further comprising the step of, if a signal is issued indicating that the received beam power exceeds the maximum permissible light level, emitting a correction signal to cause the light beam to be attenuated to an attenuated level less than or equal to the maximum permissible light level prior to scanning the light beam, wherein the maximum permissible light level is set by a safety standard of at least one of IEC 60825-1 and ANSI Z136.1.

10. The method recited in claim 1, wherein the data table further has stored therein a beam power variable for at least some of the regions related to a beam power received at the respective region, and further comprising the steps of:
    accessing the data table to retrieve the beam power variables for at least some of the regions;
    translating the retrieved beam power variables into graphical beam power representation values for the spatial grid; and
    displaying the graphical beam power representation values for at least some regions of the spatial grid, wherein, if any of the beam power variables exceeds the maximum permissible level, a visualizable warning indicium indicative of at least one hazardous X-Y scan field is displayed.

11. The method recited in claim 1, wherein controlling the beam power comprises controlling instantaneous beam power.

12. The method recited in claim 1, controlling the scanning light beam comprises omnidirectionally scanning the light beam.

13. The method recited in claim 1, wherein the scanning light beam projecting into a viewing audience with at least one viewer within the audience looking directly into the scanning light beam comprises the scanning light beam being projected into eyes of at least one human viewer.

14. The method recited in claim 9, wherein the correction signal emitting step comprises sending the correction signal to a power supply for controlling an instantaneous beam power of the scanning light beam.

15. The method recited in claim 10, wherein the displaying comprises displaying on a computer monitor.

16. A system for controlling beam power of a scanning light beam being projected over a projection area by a projector for forming an image viewable in mid-air and projected toward a plurality of human viewers, wherein at least some of the viewers are looking directly toward the projector, the system comprising:
- an X-Y vector scanning light beam projected into a viewing audience;
- an image viewable in mid-air formed by the X-Y vector scanning light beam;
- a processor;
- a database operable with the processor, the database including:
  - a spatial grid representing at least a portion of the projection area over which the scanning light beam is to be directed, the grid comprising a plurality of regions having spatial coordinates correlated to the projection area; and
  - a maximum permissible light level for at least some of the regions, the maximum permissible light level based upon a viewer in the audience looking directly into the light beam; and
- software resident on the processor comprising code segments adapted for:
  - receiving spatial coordinates of an instantaneous X-Y beam position on the grid;
  - correlating the received spatial coordinates with a respective region in the data table;
  - receiving a beam power of the light beam;
  - comparing the received beam power with the maximum permissible light level at the respective region; and
  - if the received beam power exceeds the maximum permissible light level at the respective region, issuing a signal indicative thereof.

17. The system recited in claim 16, wherein at least some of the spatial grid regions comprise a size at least 7 mm by 7 mm.

18. The system recited in claim 16, wherein the at least some of the spatial grid regions comprise a size no greater than 100 mm by 100 mm.

19. The system recited in claim 16, wherein:
- the spatial grid is divided into a first portion of regions for containing a plurality of humans and a second portion of regions wherein the plurality of humans is not expected to reside, wherein both portions of regions are predetermined and fixed by a user; and
- the maximum permissible light level for the first portion of regions is less than the maximum permissible light level for the second portion of regions.

20. The system recited in claim 16, wherein the database further has stored therein, for at least some of the regions, at least one of total accumulated beam power, average beam power, total number of times the region has been scanned, average number of times the region has been scanned; a time at which the region was first scanned, a time at which the region was most recently scanned; and a pulse width experienced at the region.

21. The system recited in claim 16, wherein the software further comprises code segments adapted for calculating, for at least some of the regions based upon at least one of:
- an elapsed time between a beam entering the region and the beam leaving the region; and
- a pulse width experienced by a human eye pupil having a predetermined size, as calculated from a velocity of the beam scanning across a human eye pupil having a predetermined size.

22. The system recited in claim 16, further comprising means for receiving a command signal controlling the scanning light beam and for transmitting the received command signal to the processor, and wherein the software further comprises a code segment adapted for indirectly predicting the beam power and spatial coordinates based upon a calculation using the transmitted command signal.

23. The system recited in claim 16, wherein the software further comprises a code segment adapted for, if a signal is issued indicating that the received beam power exceeds the maximum permissible light level, emitting a correction signal to cause the light beam to be attenuated to an attenuated level less than or equal to the maximum permissible light level prior to scanning the light beam, and wherein the maximum permissible light level is set by a safety standard of at least one of IEC 60825-1 and ANSI Z136.1.

24. The system recited in claim 16, wherein the data table further has stored therein a beam power variable for at least some of the regions related to a beam power received at the respective region, and wherein the software further comprises the code segments adapted for:
- accessing the data table to retrieve the beam power variables for at least some of the regions;
- translating the retrieved beam power variables into graphical beam power representation values for the spatial grid; and
- directing a display of the graphical beam power representation values for at least some regions of the spatial grid, wherein, if any of the beam power variables exceeds a maximum permissible level, a visualizable warning indicium indicative of at least one hazardous X-Y scan field is displayed.

25. The system recited in claim 16, wherein the beam power comprises instantaneous beam power.

26. The system recited in claim 16, wherein the X-Y vector scanning light beam comprises an omnidirectional scanning light beam.

27. The system recited in claim 16, wherein the maximum permissible light level for the X-Y vector scanning light beam directed toward the viewer in the audience comprises the scanning light beam projected directly into eyes of at least one human viewer.

28. The system recited in claim 22, wherein the command signal comprises a scanner command signal driving beam scanners and a beam power command signal controlling instantaneous beam power of the light beam.

29. The system recited in claim 23, wherein the correction signal emitting code segment comprises a code segment for sending the correction signal to a power supply for controlling an instantaneous beam power of the scanning light beam.

30. The system recited in claim 24, further comprising a computer monitor, wherein the computer monitor provides the display.

* * * * *